(12) United States Patent
Conlon

(10) Patent No.: US 10,962,995 B2
(45) Date of Patent: Mar. 30, 2021

(54) MONITORING AND ENSURING PROPER AMBIENT CONDITIONS, INCLUDING CHEMICAL BALANCE, WITHIN A SHIPPING MEDIUM USED FOR TRANSPORTING AMBIENT-CONDITION SENSITIVE GOODS

(71) Applicant: Overhaul Group, Inc., West Lake Hills, TX (US)

(72) Inventor: Barry Conlon, Leander, TX (US)

(73) Assignee: Overhaul Group, Inc., West Lake Hills, TX (US)

(*) Notice: Subject to any disclaimer, the term of this patent is extended or adjusted under 35 U.S.C. 154(b) by 0 days.

(21) Appl. No.: 16/274,199

(22) Filed: Feb. 12, 2019

(65) Prior Publication Data

US 2019/0250653 A1 Aug. 15, 2019

Related U.S. Application Data

(60) Provisional application No. 62/629,178, filed on Feb. 12, 2018.

(51) Int. Cl.
| | |
|---|---|
| *G05B 15/02* | (2006.01) |
| *G05D 23/19* | (2006.01) |
| *G06Q 10/08* | (2012.01) |
| *G08B 21/18* | (2006.01) |

(52) U.S. Cl.
CPC ......... *G05D 23/1917* (2013.01); *G05B 15/02* (2013.01); *G06Q 10/0832* (2013.01); *G06Q 10/0833* (2013.01); *G08B 21/182* (2013.01)

(58) Field of Classification Search
CPC ............... G05D 23/1917; G05B 15/02; G06Q 10/0832; G06Q 10/0833; G08B 21/182
See application file for complete search history.

(56) References Cited

U.S. PATENT DOCUMENTS

| | | | | |
|---|---|---|---|---|
| 4,663,725 A | * | 5/1987 | Truckenbrod | ..... B60H 1/00014 165/255 |
| 5,917,433 A | * | 6/1999 | Keillor | ..................... G08G 1/20 340/540 |
| 6,927,688 B2 | * | 8/2005 | Tice | ................... G06K 7/10306 340/539.1 |
| 9,436,853 B1 | * | 9/2016 | Meyers | ................ G06K 7/0008 |
| 9,846,086 B1 | * | 12/2017 | Robinson | ................ G01K 3/04 |
| 2004/0113783 A1 | * | 6/2004 | Yagesh | ................. G06Q 10/08 340/568.1 |

(Continued)

*Primary Examiner* — Thomas C Lee
*Assistant Examiner* — Gary Collins
(74) *Attorney, Agent, or Firm* — Isidore PLLC

(57) ABSTRACT

A method for maintaining ideal ambient conditions for goods being transported within a shipping container includes a server periodically receiving, from at least one sensor located within the shipping container, a current value corresponding to the ambient condition being monitored within the shipping container. The server compares the received first parameter value with a pre-established optimal range of values and in response to the first parameter value being outside of the optimal range of values, the server triggers a correction response that notifies at least one interested party of the failure to maintain the ambient condition within the optimal range and that causes a correction in the ambient condition within the shipping container.

19 Claims, 11 Drawing Sheets

(56) References Cited

U.S. PATENT DOCUMENTS

| | | | | |
|---|---|---|---|---|
| 2007/0040647 | A1* | 2/2007 | Saenz | G06Q 10/087 |
| | | | | 340/3.1 |
| 2007/0267509 | A1* | 11/2007 | Witty | G01D 9/005 |
| | | | | 236/51 |
| 2008/0270076 | A1* | 10/2008 | Breed | G01S 7/4802 |
| | | | | 702/185 |
| 2009/0237258 | A1* | 9/2009 | Heck | H04Q 9/00 |
| | | | | 340/585 |
| 2010/0024450 | A1* | 2/2010 | Waldschmidt | F25B 5/02 |
| | | | | 62/115 |
| 2010/0253519 | A1* | 10/2010 | Brackmann | B60P 3/03 |
| | | | | 340/572.1 |
| 2010/0289669 | A1* | 11/2010 | Saltzman | H04Q 9/00 |
| | | | | 340/870.17 |
| 2011/0221573 | A1* | 9/2011 | Huat | G06Q 10/00 |
| | | | | 340/10.1 |
| 2013/0271290 | A1* | 10/2013 | Saenz | G05D 27/02 |
| | | | | 340/870.07 |
| 2013/0298575 | A1* | 11/2013 | Stark | B65D 90/48 |
| | | | | 62/56 |
| 2014/0180953 | A1* | 6/2014 | Westcott | A23B 7/152 |
| | | | | 705/332 |
| 2016/0216028 | A1* | 7/2016 | Jonsson | F25D 11/003 |
| 2016/0260059 | A1* | 9/2016 | Benjamin | G06Q 10/0832 |
| 2017/0022015 | A1* | 1/2017 | Gollu | G05B 15/02 |
| 2018/0220665 | A1* | 8/2018 | Savur | A23B 7/148 |
| 2018/0341911 | A1* | 11/2018 | Daoura | H04W 4/029 |
| 2018/0347895 | A1* | 12/2018 | Jonsson | F25D 29/003 |
| 2019/0114714 | A1* | 4/2019 | Jones | G06Q 40/08 |
| 2019/0277558 | A1* | 9/2019 | Adetola | G06Q 10/08 |

\* cited by examiner

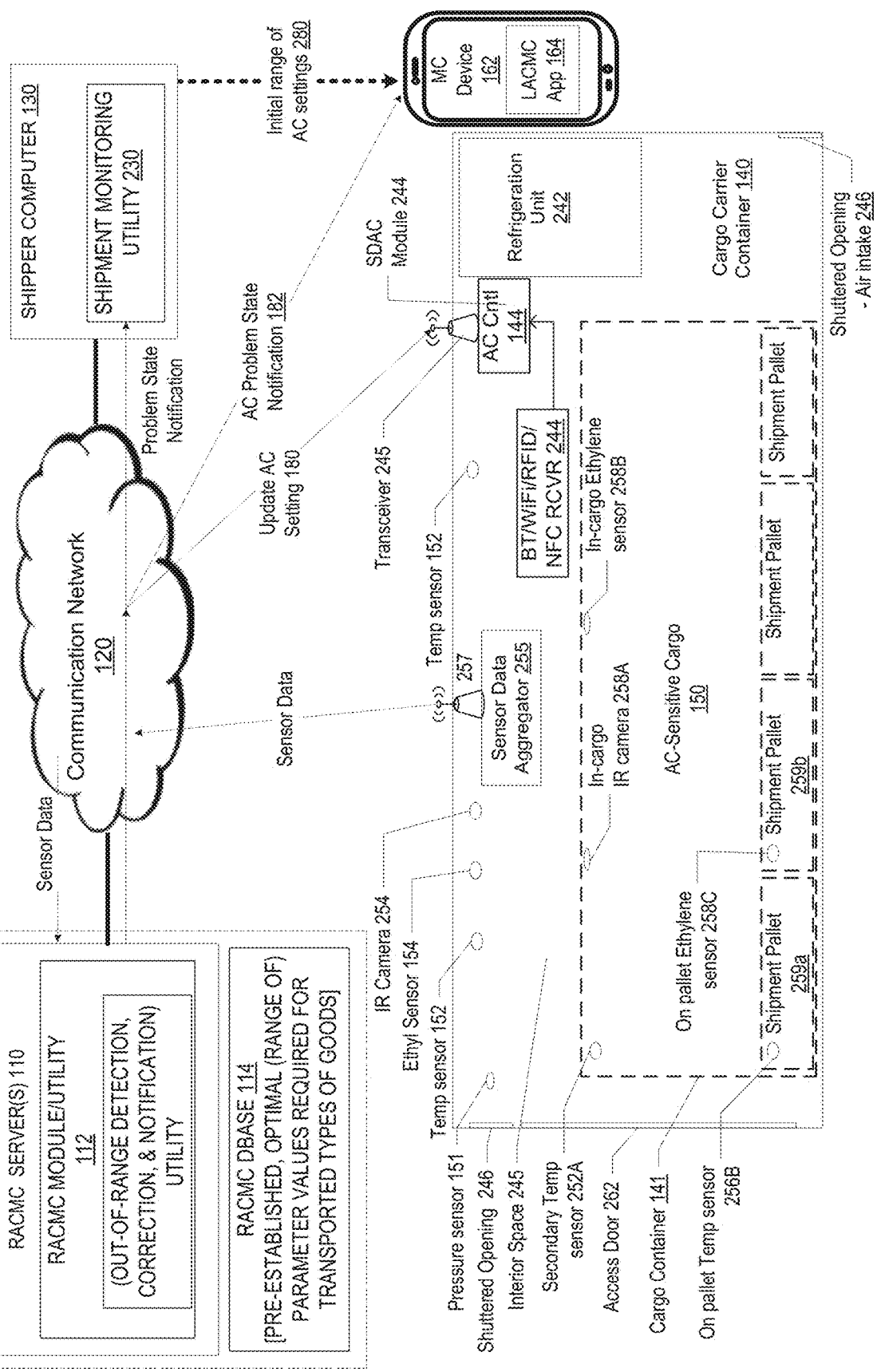

RACMC UI 390

| TYPE OF GOOD/ SHIPPING ITEM | OPTIMAL RANGE OF VALUES | CURRENT READING LEVEL | WARNING STATUS | NOTIFICATION | CORRECTION |
|---|---|---|---|---|---|
| Company A BANANAS | TEMP = 60-65 °F Ethylene < 0.5 ppm | Time = T0 T = 63.5 Ethyl = 0.04 ppm | GREEN | None | |
| Company B Perishable Product | TEMP < 45 °F | Time = T1 T = 44.6 | YELLOW | Driver/Operator Recipient | Timed |
| Company A BANANAS | TEMP = 60-65 °F Ethylene < 0.5 ppm | Time = T2 T = 65 Ethyl = 0.55 ppm | YELLOW | Driver/Operator | Reduce Temp 1 degree |
| Company A BANANAS | TEMP = 60-65 °F Ethylene < 0.5 ppm | Time = T3 T = 65 Ethyl = 0.55 ppm | RED | Driver/Operator Shipper Recipient | Reduce Temp 2 °F; Adjust Humidity |
| Company B Perishable Product | TEMP < 45 °F | Time = T3 T = 47 °F | YELLOW | Driver/Operator Shipper Recipient | Reduce Temp 3 °F |

FIG. 3B

RACMC DB 114/382

| ORIGINATING COMPANY/SHIPPER | PRODUCT | SHIPPING TRAILER/ CONTAINER TYPE | KNOWN CONTAINER DEVIATIONS | OPTIMAL SHIPPING AMBIENT CONDITION 1 (Temperature) | OPTIMAL SHIPPING AMBIENT CONDITION 2 (Ethylene level) | RANGE OF ACCEPTABLE CONDITIONS | KNOWN ADJUSTMENTS/ OFFSETS |
|---|---|---|---|---|---|---|---|
| Company 1 | Bananas Type 1 | Refrigeration A | 10% | 50 - 60 °F | < 5 ppm | 0ppm - 4.9ppm | .2 ppm |
| Company 1 | Oranges | Refrigeration A | 10% | 65 - 75 | < 20 ppm | 0ppm - 19.5ppm | |
| Company 2 | Fish produce | Refrigeration C | 2 degrees | 36 - 40 | | | |
| Company 3 | Electronics | Refrigeration B | | 55 - 65 | | | |
| Company 4 | Strawberries | Refrigeration A | 5% | 50 - 68 | < 10 ppm | 0ppm - 9.8ppm | |
| . | | | | | | | |
| . | | | | | | | |
| . | | | | | | | |
| Company N-1 | Perishable Item | | | | | | |
| Company N | Bananas Type 2 | Refrigeration A | 3 degrees | 50 - 60 °F | < 6 ppm | 0ppm - 4.9ppm | 1 ppm |

AMBIENT CONDITION TRACKING AND RESPONSE DATA 450

| Company 1 Shipment Tracker | Secondary Sensor Recording | Primary Sensor Recording | Warning Status | Notification | Trigger Remote/Local Adjustment? |
|---|---|---|---|---|---|
| At Loading Time (T0) | Temp = 75 | Temp = 73 | | | |
| Time = T1 | Temp = 59 | Temp = 57 | Alert | Notification | adjust thermostat - 2 degrees |
| Time = T2 | Temp = 55 | Temp = 53 | | | |
| Time = T3 | Temp = 62 | Temp = 59 | High Alert | Notification | adjust thermostat - 4 degrees |
| Time = T4 | Temp = 50 | Temp = 53 | Alert | Notification | adjust thermostate + 2 degrees |

FIG. 4

MONITORING AND ENSURING PROPER AMBIENT CONDITIONS, INCLUDING CHEMICAL BALANCE, WITHIN A SHIPPING MEDIUM USED FOR TRANSPORTING AMBIENT-CONDITION SENSITIVE GOODS

PRIORITY & RELATED APPLICATIONS

The present application is a conversion of and claims priority from U.S. Provisional Application No. 62/629,178, filed on Feb. 12, 2018, with the entire content of that application being incorporated herein by reference.

BACKGROUND OF THE INVENTION

1. Field of the Invention

The present disclosure is generally related to transportation of goods, and in particular to a method and system for autonomously monitoring and regulating ambient conditions for goods that are susceptible to being negatively affected during transportation.

2. Description of the Related Art

In the cargo shipment industry, certain cargo (i.e., consumable goods, equipment, and/or products) are susceptible to deterioration if not properly stored or transported. For example, perishable cargo, such as fruits, vegetables, fish, and meat products, tend to deteriorate more rapidly when not stored and transported in a properly refrigerated container and/or when exposed to certain ambient conditions or to an environment that promotes quicker (more rapid) deterioration. With the transportation of fruits and vegetables, in particular, it is important that the goods (or products) not be allowed to ripen beyond a certain ripening state between the time of harvesting to when the goods are placed on the shelves of a retailer for consumer purchase and consumption. Once harvested, these goods are typically transported from the source to the retailer in shipping containers. If the transportation environment is not properly controlled, the goods will ripen during transportation, which significantly decreases the shelf life of the goods once the goods reach the retailers and/or end consumers.

Suppliers of these products typically provide a "shelf life" stamped on the product label or the product itself, based on the expectation that the good was subject to proper refrigeration and other optimum transportation conditions during transportation. However, small changes in the conditions inside a shipping/transportation container, such as a one (1) degree increase in the temperature over a few hours, can have an adverse effect on the ripening cycle and ultimately the shelf-life of the perishable goods being transported.

Currently shippers have to rely on the transportation company and/or truck driver to maintain the shipping container and keep the temperature therein within specified acceptable ranges throughout the transportation cycle. However, with only localized/internal monitoring of these trucks and drivers by the transportation company, there is no way to know and/or guarantee that the goods are in fact kept at the correct conditions during transportation. The potential negative effect from receiving a bad or over-ripened or deteriorated shipment of perishable goods based on non-ideal shipping conditions, is passed on to the unknowing recipient retailer, the end consumer, and/or the seller of the good. Several bad shipments can severely tarnish the reputation and good will of one or more of the farm or the factory from which the product originates, the company selling the products, and/or the retailer providing the over-ripened or deteriorating products. Additionally, when the expected shelf life of a good/product is reduced, the retailer may be forced to dump large quantities of goods that remain unsold, which negatively affects the retailer and the source company providing the good/product, both financially and otherwise.

When this situation occurs, it is difficult to access any blame to the carrier/operator, even when the cause of the problem may, in significant part, stem from exposure of the goods to improper conditions during shipment from source to destination (retailer), such as conditions involving faulty refrigeration (or faulty temperature sensors) leading to incorrect ambient conditions within the transportation container. All parties in the shipment chain have a vested interest in ensuring the goods arrive at the destination without the elevated ripening or deterioration that can occur, to ensure the validity of the shelf life of the good/product and ultimately the satisfaction of the end consumer.

SUMMARY

The illustrative embodiments of the present disclosure provide a method and system for monitoring and maintaining ideal ambient conditions, including chemical balance, for one or more goods being transported within a shipping container. The method includes periodically receiving, from at least one sensor located within the shipping container, a current value of a first parameter corresponding to an ambient condition being monitored within the shipping container by the at least one sensor. The method also includes comparing the received first parameter value with a pre-established optimal value or range of values for the first parameter that represents an ideal ambient condition for the one or more goods being transported within the shipping container. The method further includes, in response to the first parameter value being outside of the optimal range of values for the first parameter: initiating an increased frequency heightened monitoring and response (IFHMP) window during which a frequency of receiving and comparing corresponding first parameter values against the optimal range of values is increased; identifying whether a next one or more first parameter value received within the IFHMP window continues to be outside of the optimal range of values; and in response to the next one or more first parameter value continuing to be outside of the optimal range of values, triggering a correction response that notifies at least one interested party of the failure to maintain the ambient condition within the optimal range and causes a correction in the ambient condition. Triggering the correction response includes issuing a notification of a failed ambient condition check and remotely triggering a correction within the shipping container to bring the first parameter value back within the optimal range of values.

According to one aspect, the at least one sensor includes an ethylene sensor and the first parameter value is a number of parts per million (ppm). The controller includes an executable module that controls a level of ethylene within the interior space to keep the level below a pre-programmed ppm by modifying, via an appropriate one of the at least one mechanical component, one or more of the variable components within the interior space of the shipping container.

According to one aspect, a system is provided for maintaining the desired ambient condition, including the chemical balance, for one or more cargo being transported. The system includes a vehicle for transporting the one or more cargo from an origination point to a destination point, the vehicle having a driver/operator and comprising a shipping container within which the one or more cargo is being transported. The system also includes a plurality of sensors located within the shipping container and which sense and records one or more parameter values of variables associated with an ambient condition within the shipping container. The system also includes a remote monitoring system having a server computer that receives the one or more parameter values of the variables associated with the ambient condition within the shipping container, the server of the remote monitoring system being communicatively connected, via at least one communication network, to the plurality of sensors to enable transfer of information related to the parameter values and the ambient condition between the plurality of sensors and the server. The server executes an remote ambient condition monitoring and failure notification and correction (FACMC) module that configures the server to: periodically receive, from at least one of the one or more sensors, a current value of a first parameter corresponding to a sensed ambient condition being monitored within the shipping container; and compare the received first parameter value with a pre-established optimal value or range of values for the first parameter that represents an ideal ambient condition for the one or more goods being transported within the shipping container. The FACMC module further configures the server to: in response to the first parameter value being outside of the optimal range of values for the first parameter: initiate an increased frequency heightened monitoring and response (IFHMP) window during which a frequency of receiving and comparing corresponding first parameter values against the optimal range of values is increased; identify whether a next one or more first parameter value received within the IFHMP window continues to be outside of the optimal range of values; and in response to the next one or more first parameter value continuing to be outside of the optimal range of values, trigger a correction response that notifies at least one interested party of the failure to maintain the ambient condition within the optimal range and causes a correction in the ambient condition. The remote server issues a notification of a failed ambient condition check and remotely triggers a correction within the shipping container to bring the first parameter value back within the optimal range of values.

According to another aspect of the disclosure, a modified shipment transportation carrier is provided. The modified shipment transportation carrier includes a shipping container having exterior walls that encloses an interior space for holding a cargo, at least one mechanical component that enables setting and modifying an ambient condition within the shipping container, and a plurality of sensors, each sensing a current parameter value of at least one variable component of the ambient condition. The shipment transportation carrier also includes a controller that is communicatively coupled, via a local connection, to each of the plurality of sensors and the at least one mechanical component and communicatively connected, via an external network, to a remote server. Each of the plurality of sensors is configured to communicate to the controller, in real time, the current parameter value of the at least one variable. The controller operates as an aggregator of information received from the at least one sensor and transmits, via the external network, the received current parameter values to the server for remote tracking of the ambient condition within the shipping container. The at least one sensor includes an ethylene sensor, and the controller includes an executable module that controls a level of ethylene within the interior space to below a pre-programmed number of parts per million by modifying, via an appropriate one of the at least one mechanical component, one or more of the variable components within the interior space. The controller includes a transceiver and is configured to: receive, via the transceiver, control instructions communicated from the server to modify one or more parameter values associated with the ambient condition; and in response to receiving the control instructions, trigger the at least one mechanical component to modify a corresponding variable component of the ambient condition.

Another aspect of the disclosure provides a method of locally monitoring and adjusting ambient condition settings for a cargo that requires specific ambient conditions within a shipping container during transportation. The method includes communicatively connecting, by a controller, to at least one sensor placed in proximity to a cargo being monitored by a shipment monitoring service, the at least one sensor sensing a real-time value in one or more specific ambient conditions within a shipping container in which the cargo is being transported, the at least one sensor including at least one secondary sensor provided by the shipment monitoring service. The method also includes receiving, from the at least one sensor, sensor data indicating a real-time parameter value of at least one variable contributing to a current ambient condition of the shipping container. The method further includes transmitting, via a communication device associated with the controller, the received data to a remote monitoring server, the remote monitoring server executing a RACMA utility that enables the remote monitoring server to determine a correct ambient condition and identify when the correct current ambient condition falls out of bounds for a predetermined optimal range for the ambient condition required for the specific cargo being transported within the container. The method also includes communicatively connecting the controller with a local ambient condition controlling mechanism that supports both local and remote adjustments of one or more parameter settings that control the ambient condition. In response to receiving, from the remote monitoring server, a control setting that modifies the parameter value associated with a specific ambient condition that is configurable by the local ambient condition controlling mechanism, the method includes triggering the local ambient condition controlling mechanism to implement the control setting to enabling modification of the parameter value associated with the ambient condition surrounding the cargo within the container.

According to one embodiment, the shipping container comprises a primary sensor for locally tracking a value associated with the specific ambient condition, the primary sensor being associated with and utilized by the carrier to independently determine the current ambient condition. The method then also includes comparing, via a processor of the controller, a second reading of the at least one secondary sensor with a first reading of the primary sensor and determining when a difference between the second reading and the first reading is greater than a pre-established maximum difference threshold value. Then, in response to the difference between the first and second readings being greater than the pre-established maximum difference threshold value, the method includes generating a faulty reading notification message and transmitting the faulty reading notification message to at least one of the driver's mobile communication device, the remote monitoring server, a communication/computer device of the carrier, and a communication/computer device of the shipper.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE FIGURES

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2 illustrates additional implementation details of an example shipment tracking and communication system, including details of the local ambient condition sensors, including primary and secondary sensors and an ambient condition controller located within the shipping container, according to one or more embodiments;

FIG. 3B illustrates an example user interface for a RACMC utility that is concurrently monitoring the ambient condition of two different cargoes being transported within different shipping containers over a time period, in accordance with one or more embodiments;

FIG. 4 is a block diagram representation of a RACMC database which includes received data from one or more local sensors corresponding to ambient conditions, detected by the local sensors, proximate to AC-sensitive cargo being transported within a transportation medium such as a shipping container, according to one or more embodiments;

DESCRIPTION OF ILLUSTRATIVE EMBODIMENTS

Figure 1:
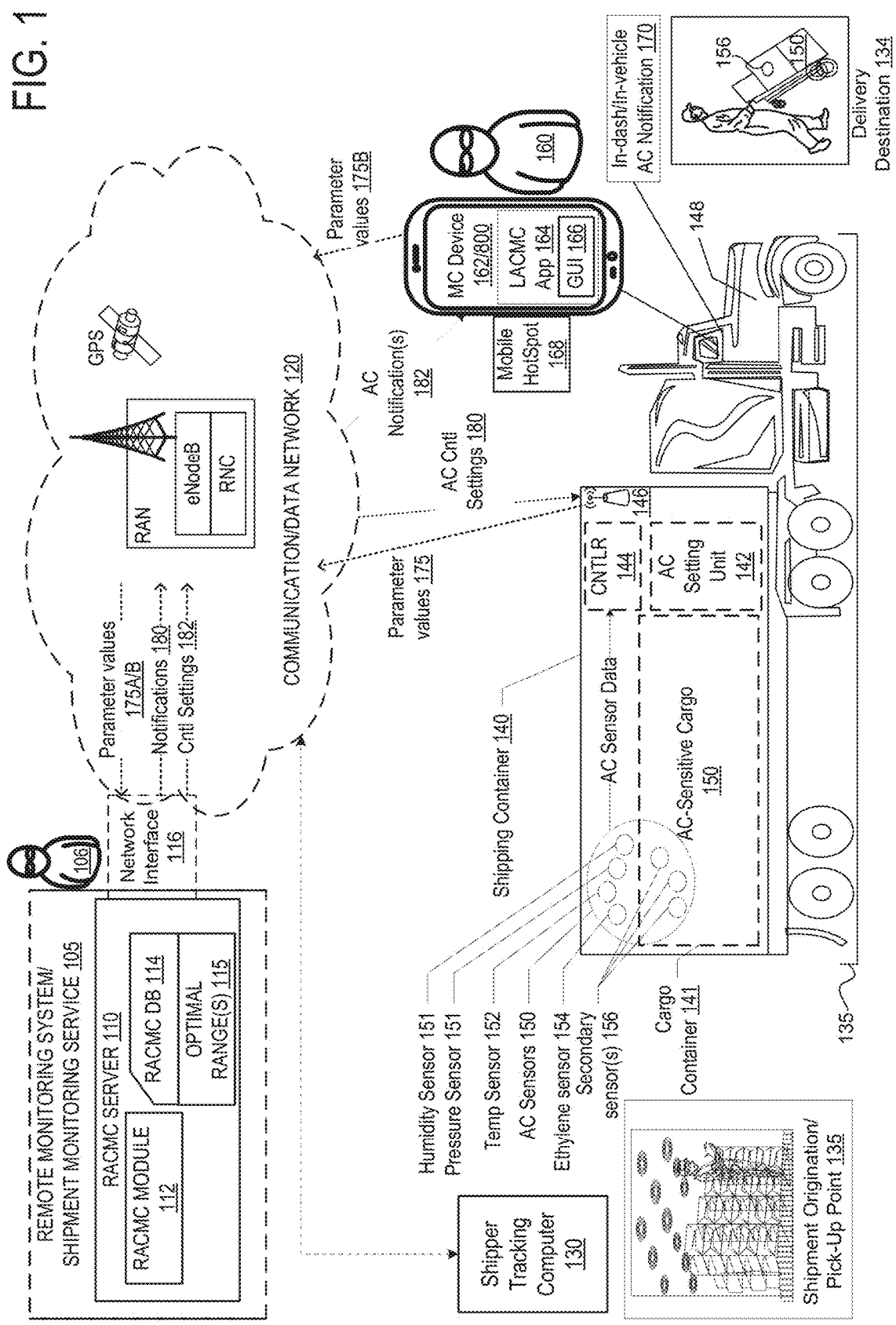
FIG. 1 illustrates an example shipment tracking and communication system that enables local and remote monitoring of ambient conditions within a shipping container and responding to specific "out of bounds" conditions detected with the ambient conditions, according to one or more embodiments.

According to one or more aspects, the illustrative embodiments of the present disclosure provide a method, a distributed/remote ambient condition monitoring and correction (RACMC) communication system, and a modified cargo transportation carrier that enables verification and modification of ambient conditions (AC) during transportation of AC-sensitive cargo in a shipping container.

As utilized herein, the term AC-sensitive cargo refers generally to any transportable or storable goods that are subject to ripening, deterioration, spoilage, or other negative changes due to exposure to improper (or non-optimal) ambient conditions. Additionally, the ambient conditions are described as including one or more variable components, including, but not limited to, pressure, temperature, chemical composition, with associated parameter values that can be modified or changed (mechanically or electrically). Further, the references to improper (or non-optimal) ambient conditions are described as being directly correlated to the parameter values of the variable components being outside of a pre-established optimal range of acceptable values for that parameter, where the ambient condition falls "out of bounds" for the particular cargo when the parameter value for at least one of the monitored variable components falls outside of the optimal range for that variable component.

According to one embodiment, the parameter/control settings can be associated with a physical condition, such as temperature or pressure, and are also associated with a chemical condition, such as an amount (measured in parts per million—ppm) of ethylene gas to which the cargo is exposed. As one aspect, the disclosure substantially reduces the occurrence of certain conditions that can negatively affect perishable goods that are subject to ripening if exposed to chemical conditions during transportation that speeds up the ripening process of the goods. The disclosure then provides a system and method for tracking and ensuring proper ambient conditions, including chemical balance, within a refrigeration container transporting AC-sensitive goods, including the perishable goods.

As one example of a specific embodiment, a perishable good/produce, such as bananas, is transported in a sealed refrigerated container. The bananas are known to undergo a ripening process that is directly triggered and/or accelerated by exposure to ethylene gas. The ethylene gas can be generated by ripening of the good during transportation and/or otherwise introduced into the shipping container by other means. Exposure to elevated levels of ethylene gas ($C_2H_4$) (e.g., above 50 ppm for bananas) can increase the rate of ripening by most fruits and vegetable products. The shelf life of the produce once the produce arrives at the destination is pre-determined/preset, in part based on the expectation by the originating company and shipper that the ambient condition within the container does not cause acceleration of the ripening process due to the introduction of elevated levels of ethylene or another ripening agent into the container.

To counter the effects of ripening during shipping, the inside of the shipping container is maintained at a specific temperature that is pre-set based on the specific produce being transported, in order to prevent the produce from ripening more than an expected amount during transportation of the produce to the end customer or retailer. The specific temperature is selected as a temperature below which a rate of ripening of the produce is substantially lowered or halted, thus eliminating/slowing the buildup of ethylene gas that would otherwise be generated by and further accelerate the ripening process. However, keeping the container at that temperate is based on a one-time setting of a first carrier-provided thermostat and/or temperature sensor that is linked to the refrigeration unit. If the refrigeration unit is malfunctioning or the carrier-provided thermostat or temperature sensor is not properly calibrated, the readings of the thermostat and/or temperature sensor may not accurately reflect the actual temperature within the container and/or the temperature to which the goods are being exposed.

One aspect of the present disclosure counters the effects of this faulty and/or inaccurate reading and the possible negative effects that could result therefrom. Accordingly, a first aspect of the disclosure involves (i) outfitting at least one of the trailer, container, product container, or pallet with a secondary temperature sensor to verify the temperature reading of the built-in (i.e., carrier-provided) temperature sensor of the trailer/container and (ii) outfitting at least one of the trailer, container, product container, or pallet with an ethylene sensor to monitor and report a current level of ethylene within the trailer/container. Both the second temperature sensor and the ethylene sensor are communicatively linked to a controller and/or a remote server, via a wireless communication network, to periodically or continuously transmit the second temperature reading and/or ethylene level reading, respectively, to the remote monitoring server. The remote monitoring server maintains a pre-programmed "good temperature range" and "acceptable ethylene level" for the particular shipment of goods.

The attached figures present various aspects and/or features of the described embodiments. Within the descriptions of the different views of the figures, similar elements are provided similar names and reference numerals as those of the previous figure(s). It is understood that the use of specific component, device and/or parameter names or nomenclature is for example only and not meant to imply any limitations on the described embodiments. The embodiments may thus be described with different nomenclature and/or terminology utilized to describe the components, devices, parameters, methods and/or functions herein, without limitation. References to any specific proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The description of the illustrative embodiments should therefore be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. Those of ordinary skill in the art will appreciate that the basic configurations depicted in the figures may vary. The illustrative components are not intended to be exhaustive, but rather are representative to highlight essential components that are utilized to implement aspects of the described embodiments. For example, other devices/components/features may be used in addition to or in place of the ones depicted and/or described. The depicted example is not meant to imply design, usage, or other limitations with respect to the presently described embodiments and/or the general innovation.

With reference now to the figures, and beginning with FIG. 1, there is illustrated an example shipment tracking and communication system for use in monitoring ambient conditions of a cargo within a shipment container and responding to specific "out of bounds" conditions detected with the ambient conditions, according to one or more embodiments. FIG. 1 is further described with reference to FIG. 2, which illustrates additional implementation details of the example shipment tracking and communication system, including details of the local ambient condition sensors within the shipping container. As shown by the figures and in accordance with one aspect of the disclosure, shipment tracking and communication system 100 (or system 100) is configured to maintain the desired ambient condition, including the chemical balance, for one or more cargo 242 being transported within a shipping container 140. The system 100 includes a vehicle (generally 135) for transporting the one or more cargo 150 from an origination point 132 to a destination point 134. The vehicle 135 has an assigned driver/operator 160 and includes a shipping container 140 within which the one or more cargo 150 is being transported. In the presented embodiment, the vehicle 135 also includes a truck/tractor 148 to which the shipping container 140 is attached. The system 100 also includes a plurality of sensors 150 located within the shipping container 140 and which sense and records one or more parameter values of variables associated with an ambient condition within the shipping container 140. The system also includes a remote monitoring system 105 having a RACMC Server 110 (i.e., a computer) that receives the one or more parameter values of the variables associated with the ambient condition within the shipping container 140. Remote monitoring system 105 can also be interchangeably referred to as shipment monitoring service 105 and includes shipment monitoring personnel 106. The RACMC server 110 of the remote monitoring system 105 is communicatively connected, via at least one communication network 120, to the plurality of sensors 150 to enable transfer of information related to the parameter values 175 and the ambient condition between the plurality of sensors 150 and the RACMC server 110.

According to one embodiment, the RACMC server 110 executes a RACMC module 112 that configures the server 110 to perform a series of functions. The functions include the server, periodically receiving, from at least one of the one or more sensors 150, a current value of a first parameter corresponding to a sensed ambient condition being monitored within the shipping container 140. The functions also include the server comparing the received first parameter value 175A with a pre-established optimal value or range of values for the first parameter that represents an ideal ambient condition for the one or more goods being transported within the shipping container 140. The RACMC module 112 further configures the server 110 to perform certain functions in response to the first parameter value being outside of the optimal range of values for the first parameter. The server 110 initiates a heightened monitoring and response (HMP) time window during which a frequency of receiving and comparing corresponding first parameter values against the optimal range of values can be increased, and the server 110 identifies whether a next one or more first parameter value received within the IFHMP window continues to be outside of the optimal range of values. The RACMC module 112 further configures the server 110 to, in response to the next one or more first parameter value continuing to be outside of the optimal range of values, trigger a correction response that notifies at least one interested party of the failure to maintain the ambient condition within the optimal range and that causes a correction in the ambient condition.

In one embodiment, the RACMC module 112 further configures the server 110 to generate and issue a notification 180 of a failed ambient condition check, and to remotely trigger a correction within the shipping container 140 to bring the first parameter value back within the optimal range of values. According to one embodiment, in order to initiate the HMP window, the RACMC module 112 configures the remote server 110 to activate a timer to track an elapsed time since receipt of the first parameter value that was outside of the optimal range of values. The HMP window is a pre-set amount of time during which multiple sensor readings are received for the first parameter and compared to the range of values to confirm whether the determination that the first parameter value was outside the range of values was either a false reading or was triggered based on a temporary condition that was resolved before expiration of the HMP window.

According to one embodiment, in triggering the correction response, the remote server 110: generates and communicates a notification to at least one interested party from among a driver/operator 160 of a tractor 148 hauling the shipping container 140, a carrier (not shown), a shipper (130), monitoring system personnel (at monitoring system 105), and a shipment recipient personnel (at delivery destination 134), and a third party (not shown) registered to receive notification of the ambient condition being out of bounds. The server 110 remotely communicates the notification 180, via the one or more communication networks 120, to a respective mobile communication device 162 of the driver/operator 160 and/or to an in-vehicle shipment tracking device 170 configured with an output mechanism (visual and/or audible). In at least one embodiment, the in-vehicle shipment tracking device can be located within the dashboard of the truck/tractor 148. In one embodiment, the server 110 also communicates at least one operation (i.e., a control setting 182) that is required to counter or reverse the change in the ambient condition to bring the first parameter value back within the optimal range of values. The control setting 182 can be communicated within the notification to the personnel in proximity to the shipping container or as a separate communication to a controller 144 that controls the mechanism (142) responsible for changing the parameter values of the variables associated with the ambient condition.

In one embodiment, the RACMC module configures the remote server to record an occurrence of an ambient condition failure within a shipment tracking database (e.g., RACMC DB 114) communicatively connected to the server 110 or maintained within server 110, in alternate embodiments. The server 110 confirms, by comparing subsequently received first parameter values 175A against the optimal range of values 115, whether a reversal of the "out of bounds" condition has been successful within the preset timeframe. As provided herein, a successful reversal of the out of bounds condition includes a return of the measured temperature, humidity, pressure, ethylene level, or other variable being monitored by a respective sensor to within the optimal range of values for that specific variable. In response to the subsequently received first parameter values being within the optimal range of values, which is indicative of a successful return to the desired ambient condition, the server 110 forwards, via the communication network 120, information (180) related to the occurrence of the AC out of bounds condition to a computer device of at least one of the carrier (162) and the shipper (130). However, in response to the server 110 not receiving confirmation, the server 110 escalates a status of the AC out of bounds condition and communicates an escalated status notification (180B) to each interested party, including the driver/carrier 160, and at least one of the shipper 130 and the monitoring service personnel 106.

According to one aspect, the system 100 includes at least one local control mechanism (or controller) 144 located within the vehicle (i.e., either one of the shipping container and the truck/tractor). The control mechanism 144 operates as an ambient condition setting unit and is communicatively connected to the remote server 110 via one of the at least one communication network 120. The control mechanism 144 executes program code of a sensor data aggregation and communication (SDAC) module 244, which enables several of the features provided locally at or in the shipping container, as described herein. The RACMC module further configures the remote server 110 to monitor for at least one correction response from among (i) a change in the ambient condition resulting in a next set of parameter values being within the optimal range of values and (ii) confirmation from the personnel in proximity to the shipping container 140 that the at least one operation (182) has been successfully completed within a preset timeframe. In response to not receiving at least one correction response, the server 110 enables remote access, by one of a remote server and a remote technician (e.g., personnel 106) to the control mechanism 144 within the shipping container 140 to remotely trigger a change in the detected ambient condition, such that the first parameter value falls within the optical range of values.

Within FIGS. 1 and 2, certain additional features are provided within the system 100 to represent the specific embodiment in which a chemical composition, and particularly the ethylene level, of the environment within the shipping container 140 is being monitored. The use of ethylene sensors 154 are provided where the cargo includes or is a good that ripens or spoils as a result of the introduction of ethylene into the shipping container 140 above a certain ppm threshold during transportation. The presented AC sensors 150 includes a set of sensors that are associated with the shipping container 140 and can be sensors that are embedded within and a part of the shipping container 140. These sensors are also referred to herein as primary sensors, in one embodiment, and include pressure sensor 151, temperature sensor 152 and optionally ethylene sensor 154.

Additionally, at least one secondary sensor 156 is provided. Secondary sensor (s) 156 are sensors that are associated with the shipment and can be located inside or on the cargo container 141 or on the pallet(s) 259*a-b* on which the cargo 150 is placed. The secondary sensors 156 can include similar sensors as the primary sensors, but are provided with the cargo, at the time the cargo is placed within the shipping container. These secondary sensors 156 enable a third-party, independent verification of the real-time ambient conditions (including chemical composition—ethylene ppm levels) to which the cargo is being exposed to while the cargo is being transported within the shipping container to the destination 134.

Prior to shipment of a cargo that requires monitoring of ambient conditions, a shipper of the cargo 150 would receive one or more secondary sensors 156 from the shipment monitoring service 105 and embed or attached or insert the secondary sensors 156 in/on at least one of (i) the interior space 245 of the shipping container 140, (ii) a packaging of the cargo or cargo container 141, or (ii) a pallet 259 on which the cargo 150 is placed for transportation. The secondary sensors would be in addition to the primary sensors available within the shipping container. The secondary sensors 156 utilized would be specific sensors that detect/senses one or more variables, such as temperature, pressure, humidity, and chemical composition (e.g., ethylene levels) which make up or contribute to the ambient conditions surrounding the cargo, while the cargo is being transported. The shipping container 140 is thus enhanced with these secondary sensors 156 to enable local monitoring/tracking of a real-time parameter value associated with the specific variable being monitored and which contributes to or makes up the ambient condition. The secondary sensors 156 enable the monitoring service 105 to independently determine the current ambient condition surrounding the cargo.

It is appreciated that in at least one embodiment, controller 144 can also be provided by the shipment monitoring service 105 and is preconfigured to connect with at least the secondary sensors 156 ad potentially all sensors (150) once the sensors are brought into proximity to the controller 144 and activated, or vice versa. Thus, sensors (156 or 150) are preconfigured with transmission capabilities for near field or proximity transmission up to a certain range (e.g., 75 feet), which range may be based on the maximum distance or size of the shipping container 140. Similarly, controller 144 is configured with communication capabilities to enable receipt of the transmitted sensor data (i.e., real time readings or parameter values).

Also, with the secondary sensors 156 embedded within the interior of the shipping container 140, sensing the real-time ambient condition of the cargo 150, the shipment monitoring service 105 and by extension all relevant parties to the shipment, are provided two readings of the same variable (primary sensor and secondary sensor reading) being monitored. This enables the monitoring service 105 to have a more reliable reading of that variable and not have to solely rely on the readings of the carrier's installed sensors or monitoring equipment, which may be faulty, non-functioning, and/or not properly calibrated. Additionally, in one embodiment, detected differences in the two readings are measured to enable a detection of these possible faults and/or calibration issues with the primary sensors, in order to trigger notification to the carrier and/or operator to replace and/or repair and/or recalibrate the faulty or non-functioning primary sensors.

As shown with FIG. 2, primary sensors can include pressure sensor 151, multiple temperature sensors 152, and optionally an ethylene sensor 154 and/or an IR camera 254. It is appreciated that in one or more embodiments, IR camera 254 serves a similar purpose as, and can be used as the ethylene sensor 154 and, as such, no separate ethylene sensor would be provided. Secondary sensors 156 include secondary temperature sensor 252A located within cargo container 141 and on-pallet temperature sensor 252B. Secondary sensors 156 also includes three ethylene sensors, presented as IR camera 258A, in-cargo ethylene sensor 258B, and on-pallet ethylene sensor 258C.

In one embodiment, as represented in FIG. 1, each sensor detects the real-time values for the variable this is being monitored by the particular sensor and the detected parameter values are transmitted to controller 144. Controller 144 then communicates, using a wireless transceiver device 146, the received parameters values 175 to server 110 via the communication network 120. In one embodiment, which is illustrated by FIG. 2, sensors are communicatively coupled to controller 144 via a wireless communication medium 244, which can include one or more of Bluetooth, near field communication, radio frequency identification (RFID), or wireless fidelity (Wifi) communication.

Figure 9:
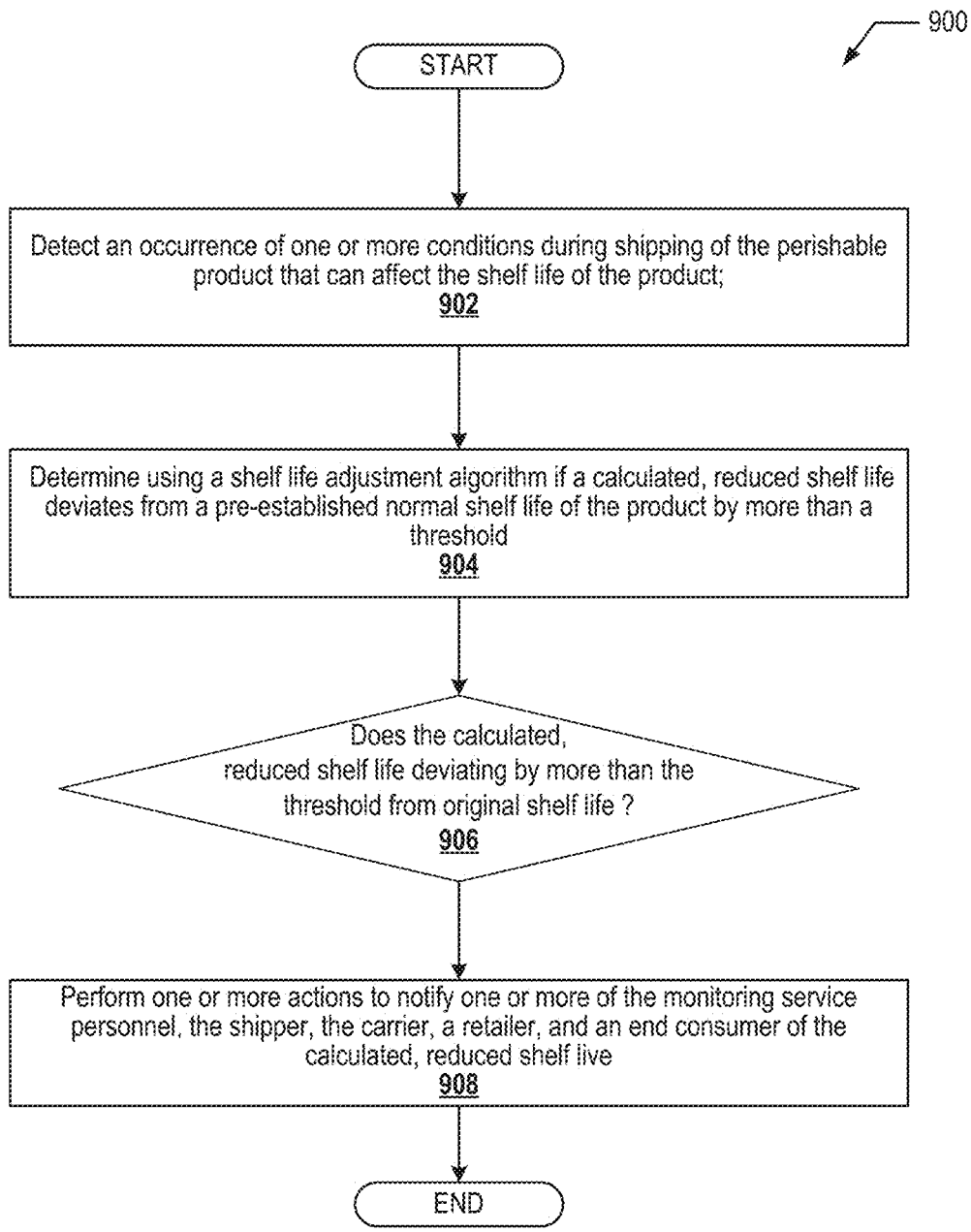
FIG. 9 is a flow chart illustrating a method for evaluating shelf life of AC-sensitive goods that are being transported by specific carriers and/or within specific containers, in accordance with one or more embodiments of the disclosure.

In an alternate embodiment, which is partially illustrated by FIG. 2 and further describe within the description of FIG. 9, controller 144 also communicates the received parameter values 175 directly to MCD 162 of the driver operator 160 via one or more wireless communication medium 244. In yet another embodiment, the sensors, and in particular the secondary sensors 156 are able to communicate their sensed parameter values directly to MCD 162, allowing for immediate driver/operator response when the one of the detected parameter values 175 is outside of the optimal range of values (115).

In one embodiment, a separate sensor data aggregator 255 is provided within one of the cargo container, shipping container, or vehicle. The sensor data aggregator 255 operates to receive the parameter values provided by the sensors and aggregate the data into a packet that is communicated to the server 110 via the communication network 120. It is appreciated that, in one embodiment, the features of the sensor data aggregator 225 can be provided as a utility incorporated into the controller 144.

In yet another alternate embodiment, the features and functionality of the separate controller 144 and data aggregator 255 are packaged into an LACMC App 164 that is downloaded onto a personal user device of the driver operator, e.g., MCD 162. With this embodiment, MCD 162 then communicatively connects to each of the sensors, and in particular the secondary sensors assigned to the particular shipment. This embodiment enables more local monitoring of the shipment, by using the available smart device of an authorized driver/operator. With this embodiment, remote monitoring is enabled by the LACMC App 164 automatically transmitting received sensor readings to the remote server 110 via the mobile communication network using the available functionality of the MCD.

According to one aspect, the at least one sensor includes an ethylene sensor, and the first parameter value is a number of parts per million (ppm). The controller includes an executable module that controls a level of ethylene within the interior space to keep the level below a pre-programmed ppm by modifying, via an appropriate one of the at least one mechanical component, one or more of the variable components within the interior space of the shipping container. For example, a change in temperature value can result in a lowering of the ethylene levels within the container.

In one embodiment, a separate outside-air circulation control system can be provided within the shipping container, where the control system includes a control mechanism that controls opening and closing of a shuttered opening 246 in one or more of the exterior walls of the shipping container. With this configuration of the shipping container, the controller 144 can be controlled to trigger the control mechanism to open the shutters of the shuttered opening 246 and allow fresh air to ingress (via air intake) into the shipping container and remove a detected build-up of ethylene gas (or other chemical) from the shipping container (e.g., via rear opening 246).

In accordance with the features provided by FIG. 2, and according to another aspect of the disclosure, a modified cargo carrier 135 is provided. The modified cargo carrier 135 includes a shipping container 140 having exterior walls that encloses an interior space 245 for holding a cargo 150, at least one mechanical component (e.g., refrigeration unit 242) that enables setting and modifying an ambient condition within the shipping container 140, and a plurality of sensors (151, 152 . . . 256, 258), each sensing a current parameter value of at least one variable component of the ambient condition. The cargo carrier 145 also includes a controller 144 that is communicatively coupled, via a local connection (244), to each of the plurality of sensors and the at least one mechanical component (242) and communicatively connected, via an external communication network 120, to a remote server 110. Each of the plurality of sensors is configured to communicate to the controller 144, in real time, the current parameter value of the at least one variable. In one embodiment, the controller 144 operates as an aggregator of information received from the at least one sensor and transmits, via the external network 120, the received current parameter values to the server 110 for remote tracking of the ambient condition within the shipping container 140. The at least one sensor includes an ethylene sensor (154, 258B), and the controller 144 is pre-programmed with an executable module 244 that controls a level of ethylene within the interior space 245 to be below a pre-programmed number of parts per million by modifying, via an appropriate one of the at least one mechanical component (242), one or more of the variable components within the interior space 245.

According to one embodiment, the controller 144 comprises a transceiver 245 and is configured to receive, via the transceiver 245, control instructions (180) communicated from the server 110 to modify one or more parameter values associated with the ambient condition. In response to receiving the control instructions, the controller 144 triggers the at least one mechanical component (242) to modify a current value of a corresponding variable component of the ambient condition.

The cargo carrier 135 further includes a vehicle 148 attached to the shipping container 140, the vehicle 148 being controlled by a driver/operator 160 having a mobile communication device 162 that is communicatively connected to at least one of the controller 144 and the remote server 110 to provide notification alerts to the driver/operator 160 when at least one parameter value of the variable components associated with the ambient condition falls outside of an pre-set acceptable range of values.

The shipping container 140 includes at least one access door 262 that is assumed to remain closed for the majority of the shipment cycle. In one embodiment, shipping container 140 also includes shuttered openings 246 that are normally closed. Access door 262 and shuttered openings 246 are assumed to be substantially air tight when closed. Exterior air circulation into the container 140 can be controlled by opening shuttered openings 246, where adjustment of a chemical composition within the interior space 245 requires an addition of fresh air. Aspects of the illustrated and/or described embodiments assume that the interior of the shipping container 140 is sealed from external influence and/or tampering and/or not exposed to large uncontrolled changes to the expected ambient conditions within the shipping container (such as opening of the cargo door 262 for large periods of time, exposure of the goods to a high luminance light source within the container, etc.

According to one embodiment, the at least one sensor comprises an ethylene sensor, and the controller 144 includes an executable module 244 that controls a level of ethylene within the interior space to below a pre-programmed number of parts per million by modifying, via an appropriate one of the at least one mechanical component 242, one or more of the variable components within the interior space 245.

Figure 3A:
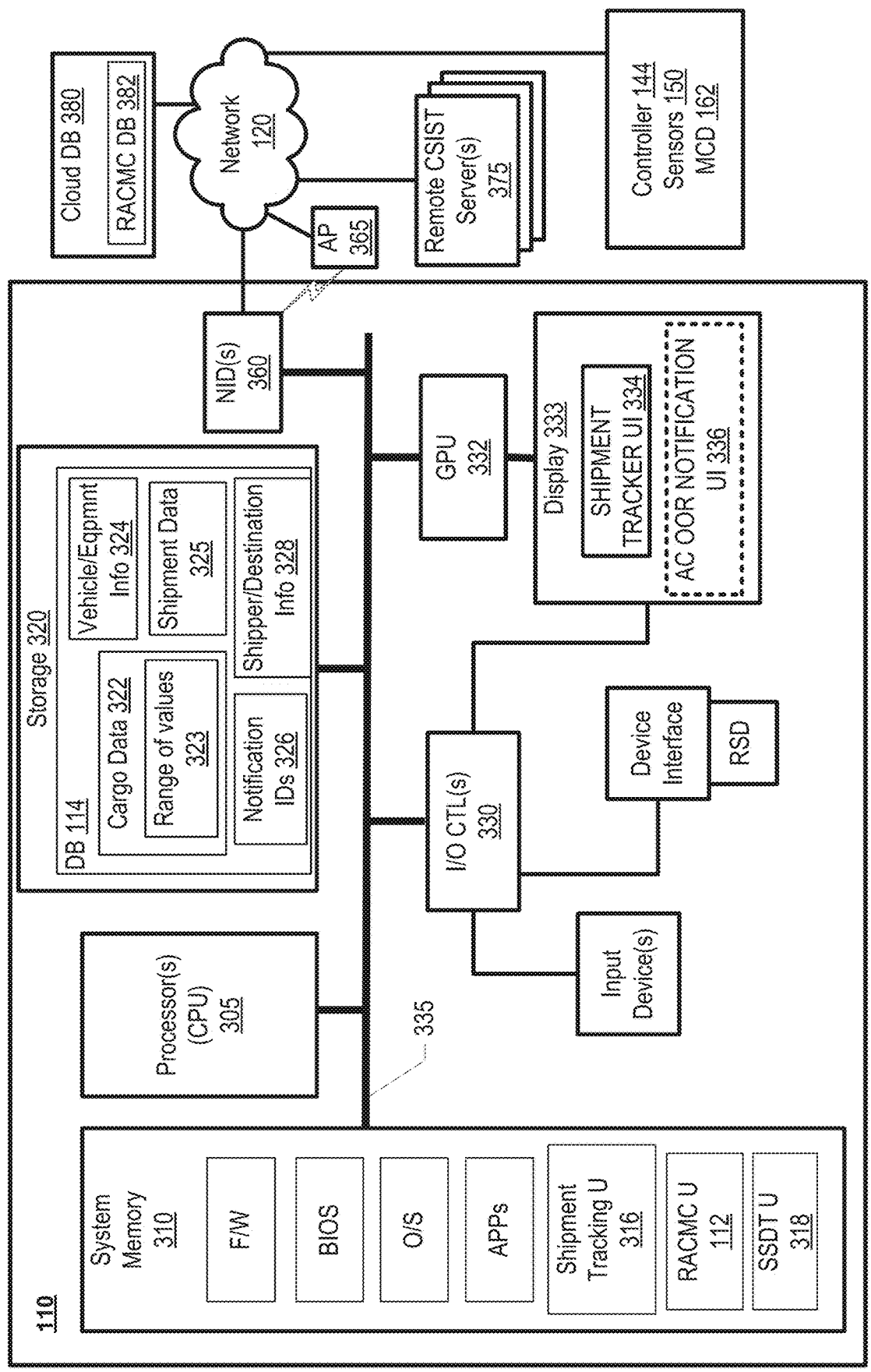
FIG. 3A illustrates an example server data processing system (DPS) that operates as a remote ambient condition monitoring and correction (RACMC) server, which implements generation of notifications in response to detected problem states with the ambient condition of goods being transported/monitored, in accordance with one or more embodiments.

With reference now to FIG. 3A and with continuing reference to FIG. 2, there is illustrated a block diagram representation of an example server 110 with a plurality of physical and functional components that enable some of the server implemented features described herein. Generally, server 110 includes processor(s) 305 coupled via system interconnect 335 to system memory 310, storage 325, and other components. System memory 310 stores a plurality of software and firmware modules, including the operating system and applications. Additionally, system memory 310 includes a shipment tracking utility 316, a remote ambient condition monitoring and control (RACMC) utility 112, and secondary sensor deviation tracking (SSDT) utility 318. RACMC utility 112 includes program code that when executed by processor 305 enables/configures the server 110 to implement several of the various features described herein. Similarly, in an alternate embodiment, SSDT utility 318 includes program code that when executed by processor 305 enables/configures the server 110 to implement the features described herein related to comparing the readings of the primary sensors and corresponding secondary sensors to detect potential faults in the primary sensors.

Server 110 also includes at least one network interface device (NID) 360 by which server 110 receives and transmits information over one or more communication networks 120.

Communication network 120 provides access to remote servers 375 and controller and sensors within shipment container. Communication network 120 also provides access to cloud storage 380 within which a remote RACMC database 382 is stored for access and use by server 110. FIG. 4 illustrates an example RACMC database 382 with column headings indicating example types of data and information that can be stored within RACMC database 382. Column headers provide information about the originating company or shipper, the cargo (good or product), the type of shipping container and any known historical deviations with the particular shipping container. Column headers also provide optimal shipping ambient conditions 1 (optimal range of temperature) and 2 (maximum ethylene level), with corresponding range of acceptable ethylene levels. Column headers further include a known adjustment or offset that has historically been made to correct out-of-range (or out-of-bounds) conditions. Additionally, as shown with the highlighted rows, the same cargo originating from a different supplier or shipper may have a different set of optimal shipping conditions that may be based on any number of known differences in the cargo, shipping container, length of shipping time, geographical region of the shipment, etc., without limitation.

RACMC database 382 includes ambient condition tracking and response data 450 which further includes real-time information and/or received data from one or more sensors corresponding to ambient conditions that are detected by the sensors surrounding AC-sensitive goods being transported within a specific shipping container, according to one or more embodiments. In the illustrated embodiment, the Company 1 shipment of type 1 bananas is being tracked, where the temperature reading inside the shipping container is assumed to correlate to the ethylene levels. Two different temperature sensors are provided inside the container and both readings are received by the controller 144 (and by server 110). As introduced herein, primary temperature sensor is the sensor provided by the carrier with the shipping container, while secondary temperature sensor is one provided by the shipper or shipment monitoring service and/or embedded with the cargo. Primary temperature sensor is presented as being faulty and/or requiring calibration for not correctly providing the temperature within the container. In contrast, secondary temperature sensor is calibrated prior to being place inside the container, and as such, the readings of secondary temperature sensor are assumed to be more accurate. In one embodiment, generation of a notification and/or subsequent local or remote adjustments of the temperature controlling mechanism (thermostat of a refrigeration or air-cooling unit) are directly linked to the readings provide by the secondary temperature sensors. However, in an alternate embodiment, the notification and adjustments are based on a difference between the two readings being above a threshold difference indicating a problem with one or both of the temperature sensors. It is appreciated that the use of a pair of ethylene sensors (one a primary sensor and the other a secondary sensor) can similarly be provided in lieu of, or in addition to, the two temperature sensors.

Returning to FIG. 3A, relevant portions of RACMC DB 382 and/or copies of the data in RACMC DB 382 are stored within local storage 320 and can be collectively referred to as a local RACMC DB 114, in one embodiment. Thus, illustrated within storage 320 are a plurality of data utilized to support the features of RACMC utility 318. As shown, storage 320 includes cargo data 322, vehicle and/or equipment information 324, shipment data 325, notification party identifiers (IDs) 326, and shipper/recipient information 328. Cargo data 322 provides information about the cargo being transported, including a type of cargo, unique ID of the specific cargo, and optimal ambient condition settings, e.g., optimal range of parameter values 323, for the particular cargo. Vehicle/equipment info 324 provides details about the vehicle that can include the types of sensors available and communication information for the controller within the shipping container. Shipment data 325 can include information about the destination of the shipment, route taken, length of time for transportation, and other information related to the shipment. Notification IDs 326 includes a list (or communication device network ID, such as an IP address or mobile device phone number) of each relevant party that is supposed to receive notification whenever the ambient condition for a particular shipment falls out of bounds. Shipper and/or destination information 328 can be specific information about the shipper and/or the end recipient.

FIG. 3B illustrates an example user interface (RACMC UI 390) for a RACMC utility 112 executing on remote server 110 and concurrently monitoring the ambient condition of two different cargoes being transported within different shipping containers over a time period (T1-T4). RACMC UI 390 can be a combination of the different UIs 334, 336 previously described or a separate UI altogether. RACMC UI 390 provides information about a shipment of bananas by company A and a shipment of a different perishable product by Company B. A different set of information related to the shipment is provided within each column, with the first column identifying the shipment, the second column identifying the optimal range of values for each variable being monitored, the third column identifying the current (real-time) value of the monitored variable, the fourth column identifying the warning status based on an out-of-bounds determination, the fifth column identifying the type of notification that is issued and the relevant party to who the notification is transmitted, and the sixth column identifying the correction, if any, that is suggested or triggered by the server for modifying the particular condition or variable that is outside of the optimal range.

Referring to the third column within the UI 390, a series of readings of temperature and ethylene levels are presented over time (T1-T4) to illustrate the changes occurring with the internal readings detected by the temperature and ethylene level sensors over time, as the cargo is being transported within the respective containers. In addition to the current reading levels for the parameter values (in column 3), a warning status is also provided to indicate when one or more of the levels enters the out of bounds condition. For simplicity, the warning status is assumed to range from green to yellow to red, with green indicating the sensor readings are within the optimal range of values, yellow indicating the sensor readings are slightly outside the optimal range of values, and red indicating the readings are significantly outside the optimal range or have been outside the optimal range for more than a threshold amount of time, resulting in the cargo being exposed to potential damage or deterioration. In the case of the cargo being bananas, the damage would then be the earlier ripening of the cargo, resulting in cargo spoilage or decrease shelf life at the retailer or end consumer. When an out of bounds condition is detected, a notification is issued to the relevant party, based on the level of the warning status, and a correction response can be included with the notification to inform a user to or otherwise remotely trigger a change in the parameter values that are out of range.

Referring again to FIG. 3A, server 110 also includes various input/output (I/O) devices that are communicatively connected to processor(s) 305 via system interconnect 335 through I/O controllers 330. Input devices include a device interface that supports insertion or coupling of a removable storage device. Output devices include a display 333 that can be connected to a graphics processing unit (GPU) 332 and which provides a display of graphical user interfaces of executing software. As shown, display provides a shipment tracker user interface 334 and an ambient condition out of bounds notification AC-OOBN user interface 336. AC-OOBN user interface 336 generates a notification to monitoring personnel associated with server 110 whenever an out of bounds condition is detected for a shipment whose ambient condition is being monitored. Additionally, in one embodiment, the AC-OOBN user interface issues a notification when a primary sensor reading falls outside of an allowed deviation from the secondary sensor reading, indicating a faulty reading or calibration of the on-board sensor of the shipping container. This notification would be triggered based on the comparison made by SSDT utility 319.

Figure 5:
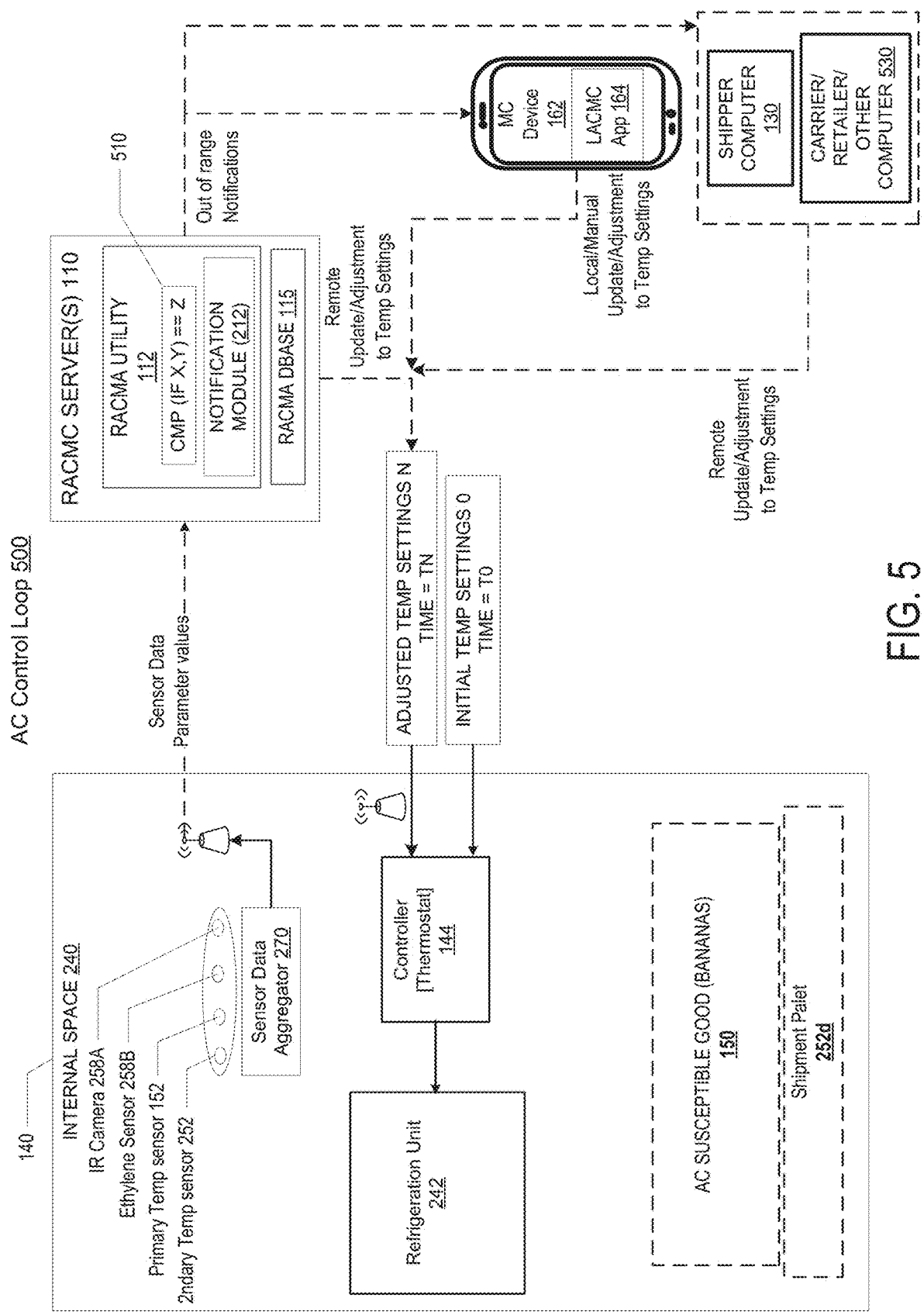
FIG. 5 illustrates an example ambient condition control loop with a remote server interconnected with a local control mechanism that can be remotely controlled to ensure proper ambient conditions within a transportation medium, in accordance with one or more embodiments of the disclosure.

With reference now to FIG. 5, which illustrates an example control loop 500 that includes a RACMC server 110 receiving sensor data from a plurality of sensors and communicating control settings with a controller located within the interior space 240 of a shipping container 140. Control loop 500 also includes RACMC server 110 communicating out-of-range notifications to operators MCD 162 and/or shipper computer 130, carrier computer 530 or other computer devices or communication devices of persons/entities having an interest in the shipment of the cargo. In the presented embodiment, any one of the associated entities can be enabled to trigger an update or adjustment to the temperature settings within the internal space by communicating with the controller 144. As shown, the AC-susceptible good is a shipment of bananas 150 and the controller 144 be or can include a smart thermostat that is associated with controlling a refrigeration unit 242 within the shipping container. As further shown, RACMC server 110 can provide a remotely-triggered adjustment of the controller, where a local or manual adjustment is not provided by the operator and/or the operators MCD 162 executing the LACMC App 164. Additionally, in one embodiment, the control loop 500 can include a process by which the shipper or other person can trigger a remote adjustment of the controller 144 in order to maintain the ethylene level below the desired level within the shipping container 140. The adjustments occur at time T(N), while the cargo is being transported, and the adjustment(s) updates the prior temperature settings that may have been provided at the start of the control cycle when the cargo was first placed in the shipping container.

Figure 6:
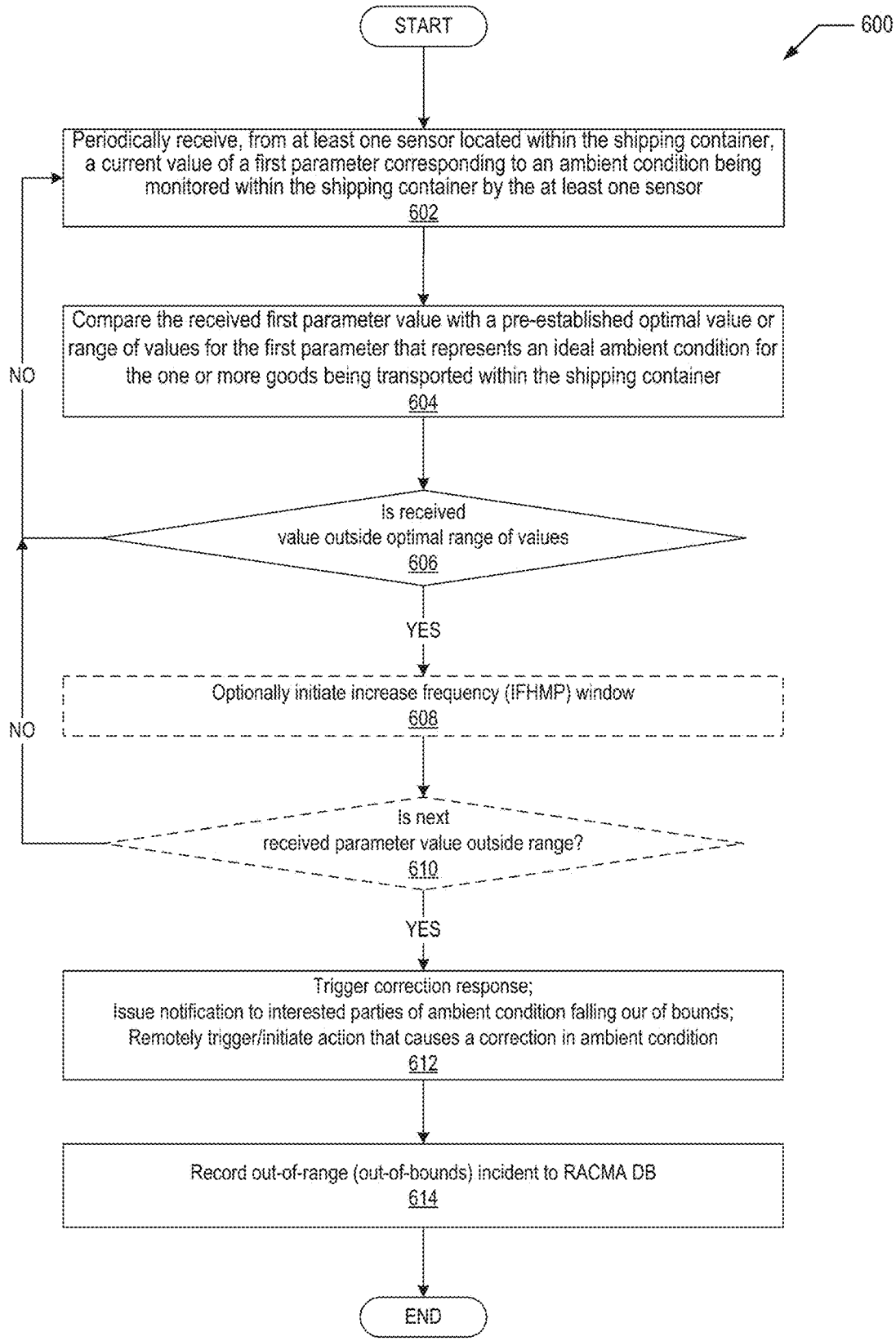
FIG. 6 is a flow chart illustrating a method for remote monitoring and modifying of ambient conditions (AC) of AC-sensitive cargo being transported within a closed/controlled transportation medium, in accordance with one or more embodiments of the disclosure.

Additional aspects of the FIG. 5 control loop 500 are presented within the descriptions herein, including in the description of the flow chart of FIG. 6, which provides a method 600 for monitoring and maintaining ideal ambient conditions, including chemical balance, for one or more goods being transported within a shipping container. The processes provided by the method are primarily performed by processor 305 of server 100 executing program code of RACMC utility 318, which configures server 100 to perform the various functions.

The following description of method 600 is provided with reference to the preceding figures and with continuing reference to FIG. 5. Method 600 begins at start block and proceeds to block 602. At block 602, method 600 includes periodically receiving, from at least one of the one or more sensors, a current value of a first parameter corresponding to a sensed ambient condition being monitored within the shipping container. The method also includes comparing the received first parameter value with a pre-established optimal value or range of values for the first parameter that represents an ideal ambient condition for the one or more goods being transported within the shipping container (block 604). The method further includes, determining (at decision block 606) whether the first parameter value is outside of the optimal range of values for the first parameter. This determination may involve a compare function 510 (FIG. 5), which can utilize the received sensor values from primary and secondary sensors in determining the out of range condition, in one embodiment, or a single sensor value compared against a pre-established threshold value or range of values stored within RACMC DB for the particular type of cargo. In response to determining that the first parameter value is outside of the optimal range of values for the first parameter, method 600 optionally (as indicated by the dashed lines) includes initiating an increased frequency heightened monitoring and response (IFHMP) window during which a frequency of receiving and comparing corresponding first parameter values against the optimal range of values is increased (block 608).

According to one embodiment, the IFHMP window is a pre-set amount of time during which multiple sensor readings are received for the first parameter and compared to the range of values to confirm whether the first parameter value being outside the range was a false positive or was triggered based on a temporary condition that was resolved before expiration of the IFHMP window. The initiating of the IFHMP window includes activating a timer to track an elapsed time since receipt of the first parameter value that was outside of the optimal range of values.

Method 600 further includes identifying whether a next one or more first parameter value received within the IFHMP window continues to be outside of the optimal range of values (block 610). In response to the next one or more first parameter values continuing to be outside of the optimal range of values, triggering a correction response that notifies at least one interested party of the ambient condition falling out of bounds (variable not remaining within the optimal range) and causes a correction in the ambient condition (block 612). It is appreciated that in an alternate embodiment, a single reading by the secondary temperature sensor (over a sustained time interval—e.g., 10 seconds) can be sufficient to trigger the notification and correction features without the additional steps indicated by optional blocks 608 and 610.

According to one embodiment, method 600 includes generating and communicating a notification to at least one interested party from among a driver/operator of a tractor hauling the shipping container, a carrier, a shipper, monitoring system personnel, and a shipment recipient personnel, and a third party registered to receive notification of ambient condition failures. Further, the method includes remotely communicating the notification, via one or more communication networks, to a respective mobile communication device of the driver/operator and an in-vehicle shipment tracking device configured with an output mechanism and providing within the notification to the personnel in proximity to the shipping container, at least one operation required to counter or reverse the change in the ambient condition to bring the first parameter value back within the optimal range of values.

According to one aspect, method 600 further includes recording an occurrence of an ambient condition out of bounds condition within a shipment tracking database (block 614). In one embodiment, method 600 further includes monitoring for at least one correction confirmation from among (i) a change in the ambient condition resulting in a next set of parameter values being within the optimal range of values and (ii) confirmation from the driver/operator in proximity to the shipping container that the at least one operation has been successfully completed within a preset timeframe. Method 600 further includes, in response to not receiving at least one correction confirmation, enabling remote access, by one of a remote server and a remote technician, to a control mechanism within the shipping container to remotely trigger a change in the detected ambient condition where the first parameter value falls within the optical range of values. Method 600 further includes confirming, by comparing subsequently received first parameter values against the optimal range of values, whether an attempt to reverse the out of bounds condition has been successful within the preset timeframe, and in response to the subsequently received first parameter values being within the optimal range of values, indicative of a successful reversal, forwarding, via the communication network, information related to the occurrence of the AC failure to a computer device of at least one of the carrier and the shipper. Method 600 further includes, in response to the not receiving confirmation of the success of the reversal, escalating a status of the AC failure condition and communicating an escalated status notification to each interested party, including the driver/operator/carrier, and at least one of the shipper and the monitoring service personnel 106.

Figure 7:
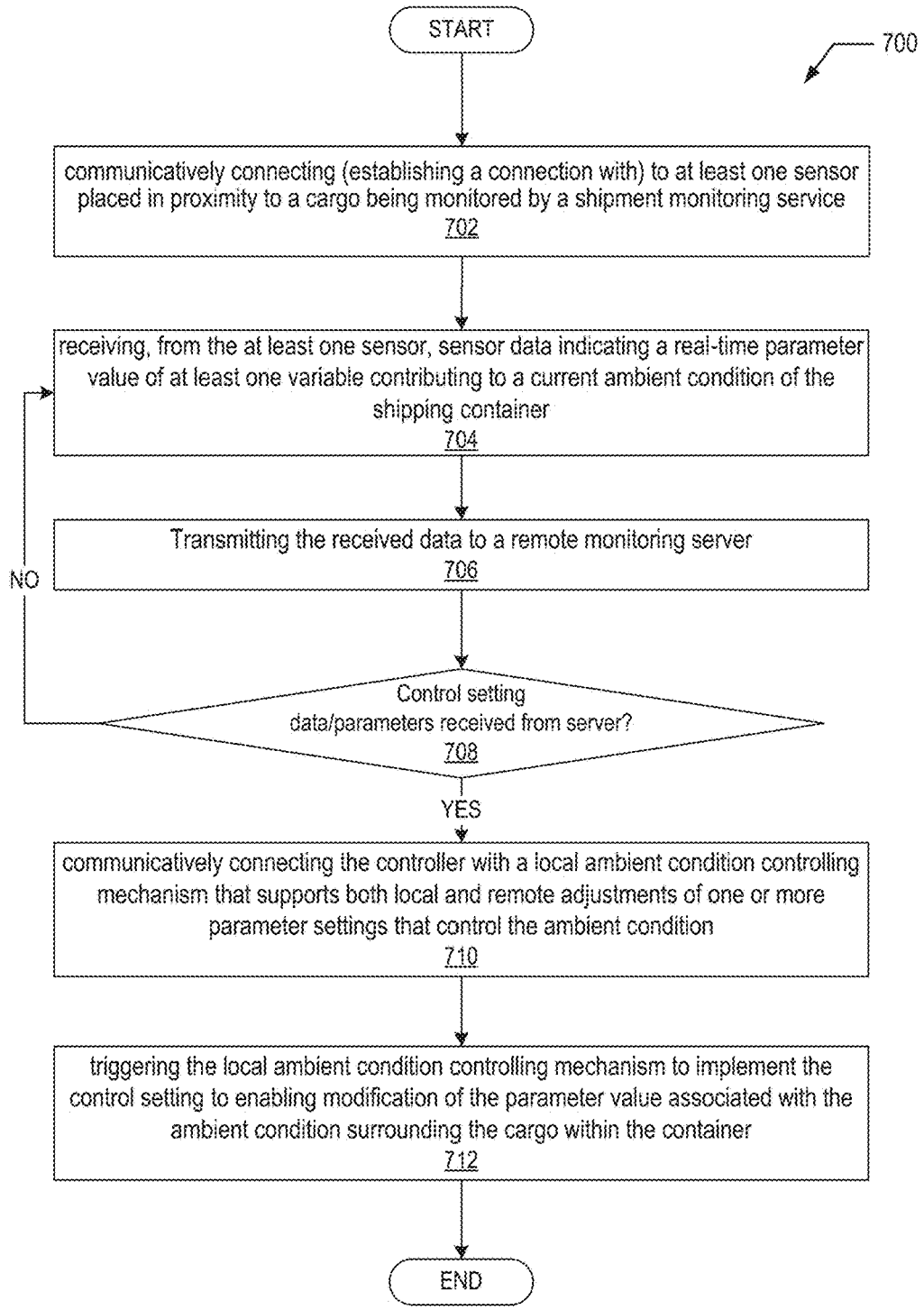
FIG. 7 is a flow chart illustrating a method for locally monitoring and modifying AC of AC-sensitive cargo that require specific ambient conditions during transportation within a shipping container, in accordance with one or more embodiments of the disclosure.

FIG. 7 presents another aspect of the disclosure, which includes a method 700 of monitoring cargo that requires specific ambient conditions within a shipping container during transportation. Aspects of FIG. 7 may be better understood with reference to FIG. 2 and the description thereof. The computer-implemented processes provided by the method are performed by the local controller 144 within the shipping container executing program instructions/code of SDAC module 244, which configures controller 144 to perform the various computer-implemented functions. Method 700 begins at start block and proceeds to block 702 at which method 700 includes communicatively connecting (establishing a connection with) to at least one sensor placed in proximity to a cargo being monitored by a shipment monitoring service 105. The at least one sensor is utilized to sense/measure a real-time value in one or more specific ambient conditions within a shipping container in which the cargo is being transported. The at least one sensor includes at least one secondary sensor provided by the shipment monitoring service. As previously described, prior to implementation of method 700, a shipper of the cargo would receive one or more secondary sensors from the shipment monitoring service 105 and embed, attach, or insert these secondary sensors to one or more of (i) the interior of the shipping container, (ii) a packaging of the cargo, or (ii) a pallet on which the cargo is placed for transportation.

Returning to the flow chart of FIG. 7, method 700 includes receiving, from the at least one sensor, sensor data indicating a real-time parameter value of at least one variable contributing to a current ambient condition of the shipping container (block 704). At block 706, the method further includes transmitting, via a communication device associated with the controller, the received data to a remote monitoring server. The remote monitoring server 110 executes a RACMC utility 112 that enables the remote monitoring server 110 to determine a correct ambient condition and identify when the correct current ambient condition falls out of bounds for a predetermined optimal range for the ambient condition required for the specific cargo being transported within the container. At decision block 708, method 700 includes determining whether a control setting data response has been received from remote monitoring server 110. The method 700 also includes communicatively connecting the controller with a local ambient condition controlling mechanism that supports both local and remote adjustments of one or more parameter settings that control the ambient condition (block 710). It is appreciated that this connection can occur prior to the connection with the sensors, and the sequence of presentation of the method blocks, following the receipt of the control setting data, is not dispositive of the actual order in which the features may be implemented. In response to receiving, as determined at decision block 708, from the remote monitoring server, a control setting that modifies the parameter value associated with a specific ambient condition that is configurable by the local ambient condition controlling mechanism, the method 700 further includes triggering the local ambient condition controlling mechanism to implement the control setting to enabling modification of the parameter value associated with the ambient condition surrounding the cargo within the container (block 712).

According to one embodiment, the shipping container comprises a primary sensor for locally tracking a value associated with the specific ambient condition, the primary sensor being associated with and utilized by the carrier to independently determine the current ambient condition. The method then also includes comparing, via a processor of the controller, a second reading of the at least one secondary sensor with a first reading of the primary sensor and determining when a difference between the second reading and the first reading is greater than a pre-established maximum difference threshold value. Then, in response to the difference between the first and second readings being greater than the pre-established maximum difference threshold value, the method includes generating a faulty reading notification message and transmitting the faulty reading notification message to at least one of the driver's mobile communication device, the remote monitoring server, a communication/computer device of the carrier, and a communication/computer device of the shipper. It is appreciated that, in one embodiment, the above described processes may be completed at the remote monitoring server 110 rather than at the local controller.

Several of the features of the disclosure are provide via an application or module that can be executed on a personal user device (PUD), such as a smartphone, tablet, or similar electronic device. The PUD includes a user interface and a processor communicatively connected to the user interface and which controls the content provided via the user interface. The PUD includes an LACMC App 164, which can be stored on a local storage device. When executed by a processor of the PUD, the ACMN application module enables the PUD to provide and/or support several of the features and functionality described herein.

In one embodiment, the PUD is a user communication device, such as a smart phone or tablet, of a driver and is equipped (or programmed) with an LACMC application (app). The LACMC app enables the PUD to be configured to receive real-time (continuously or periodically) sensor data providing the values of a tracked parameter (e.g., temperature and/or ethylene levels) within the shipping container. In one embodiment, the driver is also able to modify the parameter settings within the container locally via use of the PUD and LACMC App or some locally available adjustment mechanism. In one implementation, adjustment can only occur with the entry of a specific authorization code, which may be the driver's biometrics and/or a security passcode provided to the driver for the particular shipment.

In an alternate embodiment, the driver is provided with a separate product tracker device (PTD) associated with or communicatively linked to the sensors for the particular shipment. This PTD then notifies the driver when the ambient conditions within the trailer are not within the preset limits expected for the shipment and forwards a notification of this condition to the shipper and/or the monitoring system server. The PTD may be incorporated into the dash board of the truck and/or be otherwise provided to the driver by the shipper as a separate hands-free AC monitoring module. In one embodiment, the PTD may operate as an aggregation device that captures the readings of a plurality of sensors within the container and periodically forwards the readings to the shipment monitoring server and/or the shipper computer.

Figure 8A:
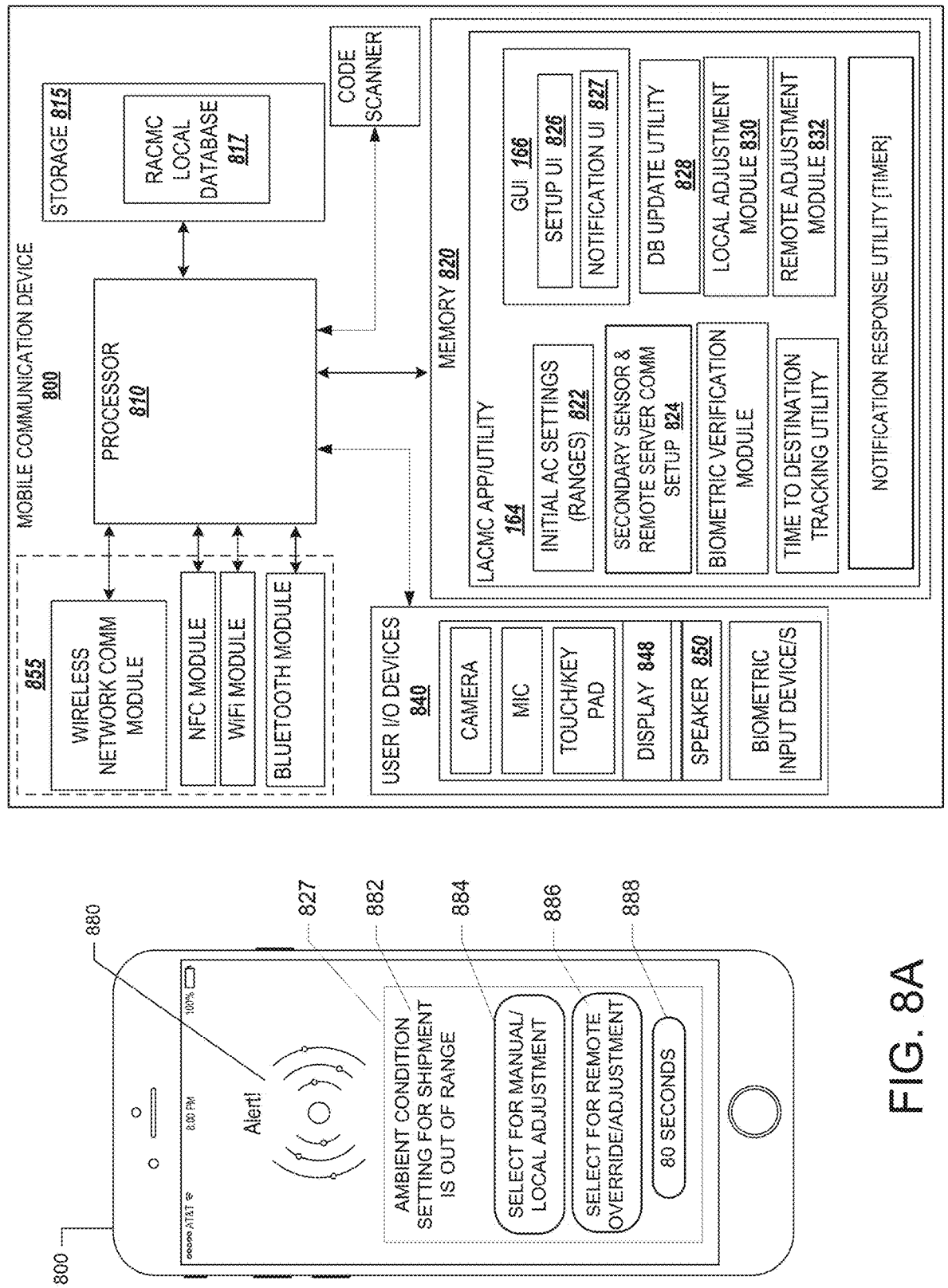
FIG. 8A illustrates an example mobile communication device (MCD) utilized by an operator/driver and which is equipped with an ambient condition monitoring app/utility that enables real-time monitoring by the driver of the ambient condition within the shipping container and provides notification to the driver/operator of detected out of bounds conditions, in accordance with one or more embodiments.
Figure 8B:
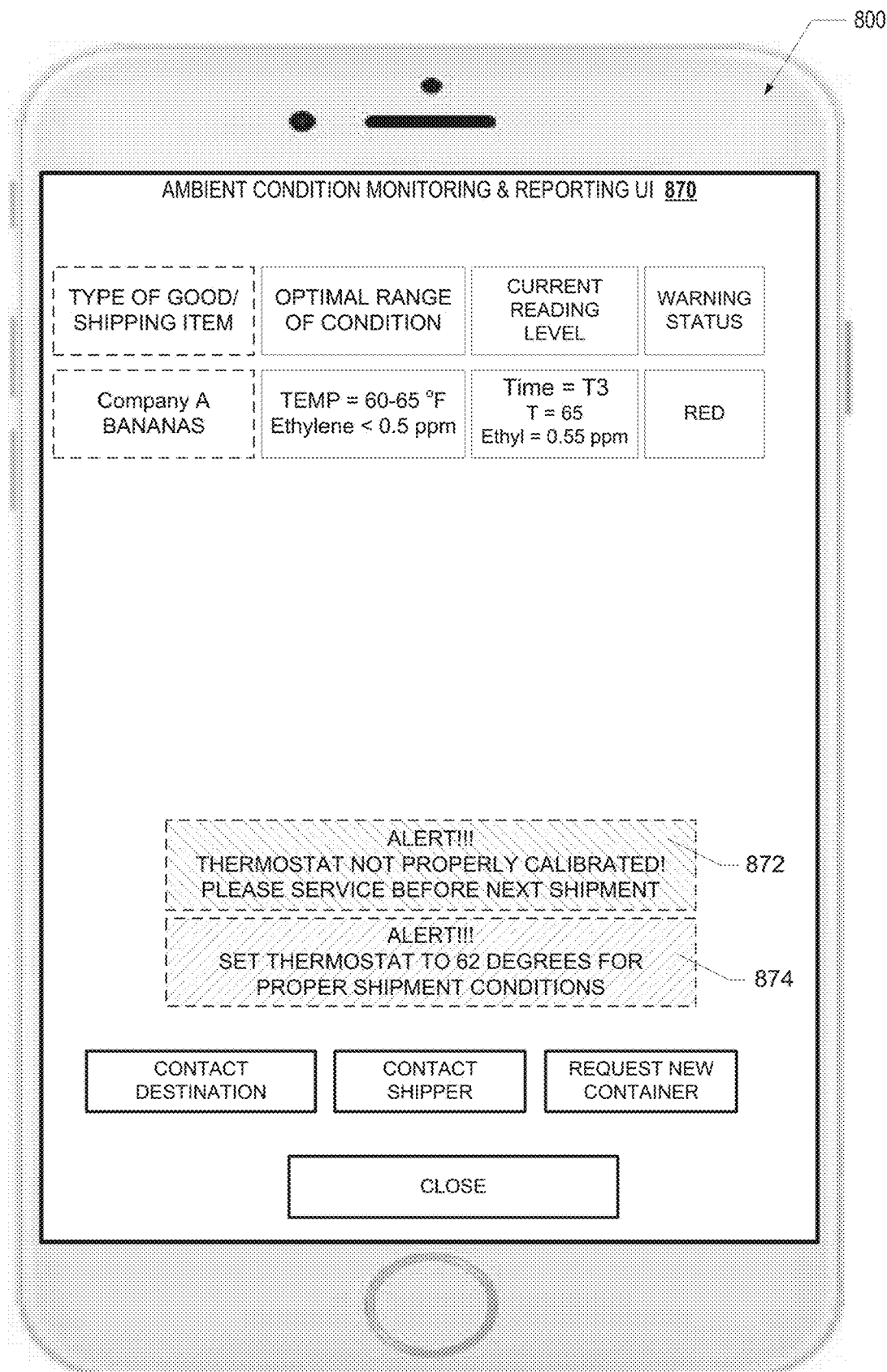
FIG. 8B illustrates an example user interface of the example ambient condition monitoring and notification (ACMN) app executing on the MCD of FIG. 3A and which presents status updates of the current ambient conditions and presents selectable options for responding to notifications of detected out of bounds problem states in the ambient condition, in accordance with one or more embodiments.

Referring now to FIGS. 8A-8B, which respectively illustrate an example mobile communication device (MCD) (or personal user device) and a graphical user interface of the MCD utilized by an operator/driver. MCD 800 is equipped with a local ambient condition monitoring app, LACMC App 822, that enables real-time monitoring by the driver of the ambient condition within the trailer (using both primary and secondary sensors) and provides notification to the driver/operator of detected out of bounds/range conditions, in accordance with one or more embodiments. The LACMC App 822 can be downloaded from server 110 of the shipment monitoring service or made available via some other resource provided by the monitoring service 105, in one or more embodiments. FIG. 8B illustrates an example user interface of the example ACMN app executing on the driver's communication device and which presents status update of the ambient conditions for multiple products and presents selectable options for responding to notifications of detected problem states in the ambient condition, in accordance with one or more embodiments.

With continuing reference to the description of the monitoring system 100 of FIGS. 1 and 2, and with reference to FIG. 8A-8B, the monitoring system 100 also includes a mobile communication device (MCD) 162 of the driver/operator 160 of the vehicle 135. The MCD 162 can be similar to and/or one and the same as MCD 800, and both reference numerals are assumed to be referring to the same component within monitoring system 100. MCD 162/800 is communicatively coupled to the remote server 110 via the at least one communication network 120. MCD 800 has LACMC App 164 installed thereon that generates and outputs, via a user interface 166, a real-time status of the ambient condition of the shipping container 140 and which presents an alert in response to the ambient condition falling outside of the preset norms for the particular cargo 150 being transported. The LACMC App 164 further configures the MCD 162 to communicatively connect to and receive, in real time, values of at least one tracked parameter and/or other information (e.g., temperature and/or ethylene levels) from the at least one sensor 150 within the shipping container 140. The LACMC App 164 further configures the MCD 162 to present to the user 160 a graphical user interface 166 that enables the user 160 to enter shipment-related authorization codes and locally modify the parameter settings within the container to within a prescribed range of adjustment.

FIG. 8A depicts a 2-dimensional view as well as a block diagram representation of the component makeup of MCD 800. MCD 800 operates within a wireless communication network, the functionality of which is assumed to be included within communication network 120 (FIGS. 1 and 2). MCD 800 can be one of a plurality of different types of devices, including but not limited to, a mobile cellular phone or smart-phone, a laptop, a net-book, an ultra-book, and/or a tablet (e.g., an iPAD®), or other computing device configured to enable wireless connectivity. The utilized device includes the necessary hardware and software to enable wireless-enabled communication between MCD 800 and a network via which information and/or data communication required to implement the various features described herein.

Referring now to the specific component makeup and the associated functionality of the presented components, MCD 800 comprises processor 810, which connects, via a plurality of interconnects (illustrated by the bi-directional arrows), to a plurality of other functional components of MCD 800. Processor 88 can be an integrated circuit that includes one or more programmable microprocessors and a digital signal processor (DSP). Processor 88 controls the communication, program code execution, power mode control, time synchronization, and other functions and/or operations of MCD 800. These functions and/or operations thus include, but are not limited to, application data processing and signal processing.

Connected to processor 810 is storage 815, memory 820, input/output (I/O) devices 840, and communication mechanisms 855. Memory 808 can include volatile memory and/or non-volatile memory. During device operation, one or more executable applications can be stored within memory 820 for execution by processor 810. For example, memory 820 is illustrated containing LACMC App 164, which is a downloadable app or utility that executes on MCD 800. LACMC App 164 includes a plurality of modules and/or subroutines that collectively enable the functions of LACMC App 164. Included within LACMC App 164 are initial settings (e.g., range of values) utility 822, secondary sensor and remote server communication setup modules 824, and GUI 166, which includes setup user interface 826 and notification UI 827. LACMC App 164 also includes database update utility 828 by which updates to RACMC database 114 (FIG. 1) and local RACMC DB 817 can be completed. In one embodiment, local RACMC database 817 includes a subset of the information/data provided within RACMC DB 114 selectively downloaded based on the identification of the shipment, cargo, shipper, carrier, driver/operator, and/or other relevant information that can affect the cargo during transportation.

LACMC App 164 also includes a local adjustment module 830 that enables communication with on-board control mechanisms, such as refrigeration unit control, and LACMC App 164 also includes a remote adjustment module 832 that enables a specific adjustment to be downloaded from server 110 for implementation by driver/operator 160 or MCD 800. In one or more embodiments, modification of the variables affecting the ambient condition of the cargo may require a secure access to the controller. Thus, in these embodiments, LACMC App 164 can also include biometric verification module 826, which is utilized to authenticate operator and provide access to certain secure functions of MCD 800. As an example, a voice or fingerprint confirmation may be required before allowing a operator/driver to change a temperature in a shipping container, so that only a specific pre-authorized operator/driver can perform the change to the ambient conditions of that cargo. The functionality associated with and/or usage of each of the software modules will become evident by the descriptions provided herein. It is appreciated that the various software modules can be independent modules that communicate with each other via processor execution of respective program code.

MCD 800 also comprises a plurality of input/output (I/O) devices 840. I/O devices 840 include, as input devices, camera, microphone, touch screen and/or touch pad and/or keypad, and biometric input devices or sensors. I/O devices 840 includes, as output devices, display 848 and speaker 850, and others. MCD 800 can include a subscriber identification module (SIM) or other similar feature that provides unique identification information of the operator that owns or utilizes MCD 800.

According to one aspect of the disclosure and as illustrated by FIG. 8A, MCD 800 supports at least one and potentially many forms of wireless, over-the-air communication, which allows MCD 800 to transmit and receive communication, including location signals, with at least one second device and/or an externally located network. To support wireless communication, MCD 800 includes one or more of the following communication components: wireless network communication module (which can include a transceiver with connected antenna, both not expressly provided), near field communication (NFC) transceiver module, wireless fidelity (WiFi) module, and Bluetooth transceiver. It is appreciated that MCD 800 can also include components for wired communication, such as modem and Ethernet modules (not shown). Collectively, these wireless and wired components provide a communication means or mechanism 855 by which MCD 800 can communicate with other devices and networks. To enable location-based services within/on the device, MCD 800 also includes a location service module, such as a GPS module, without limitation.

As a wireless device, MCD 800 can transmit data over a wireless network (e.g., a Wi-Fi network, cellular network, Bluetooth® network (including Bluetooth® low energy (BLE) networks), a wireless ad hoc network (WANET), or personal area network (PAN)). In one embodiment, MCD 800 may be further equipped with an infrared (IR) device (not pictured) for communicating with other devices using an IR connection. In another embodiment, MCD 800 may include a short-range wireless device, including, but not limited to, a near field communication (NFC) device. In still another embodiment, MCD 800 may communicate with one or more other device(s) using a wired or wireless USB connection. MCD 800 establishes communication with the at least one other device, such as remote server 110 via over-the-air signal transmission, following the exchange of specific authentication and/or access credentials. The communication between MCD 800 and the secondary sensors 156 can be via near field communication, Bluetooth, infrared (IR) transmission, and others, without limitation.

Within the 2-dimensional view of FIG. 8A, MCD 800 displays a notification screen or user interface 827 having an alert notification 880, that presents the notification message 882 and several selectable options, including a first option 884 for local adjustment of the monitored condition, a second option 886 for remote (server 110) override and adjustment of the variable causing the measure parameter value or resulting ambient condition to be out of range, and a timer 888 indicating the amount of time remaining for the driver/operator to make a selection before the remote override is autonomously selected.

Specifically, the LACMC App 164 also provides a notification 880 of a failure condition (e.g., temperature reading out of preset range of "good/ideal temperature" or detected ethylene value above or approaching a maximum ethylene threshold value). The ACMN app also provides a selectable response button to allow the driver to select an option from among a first selectable option to manually fix the problem locally or a second selectable option requesting/triggering remote intervention to address/correct the problem. The latter selection may occur because the driver cannot immediately access the container and/or the controller or mechanical thermostat to adjust the ambient conditions therein.

In one embodiment, the container can be provided with a temperature override component that enables the shipper or driver to remotely trigger a change in the temperature to within the prescribed range of acceptable temperatures. This enables a driver who is not physically at the container to remotely adjust the thermostat by entering a security/temperature override code to adjust the temperature to be within the range of acceptable temperatures. This feature can also enable the shipper or TCIS monitoring system (computer and/or personnel) to directly affect the conditions on the truck via a remote trigger and adjustment of the thermostat (s) within the container. This remote trigger can be a feature provided to the shipper as a part of the contract/agreement to utilize the particular operator/driver to ship certain types of perishable products. With this feature implemented, an abandoned shipment can be kept at the correct refrigeration level remotely until the container is recovered. Additionally, the shipper can minimize the amount of negative exposure time to the ripening agent and also receive important information associated with (or utilized to determine) the shelf life of the product based on the time during which the produce was exposed to one or more AC outside of the optimal/desired range, such as elevated levels of ethylene.

In one embodiment, the ethylene sensor is an IR camera that is programmed and/or designed to detect ethylene gas in the surrounding environment. The IR camera is capable of providing information that enables detection of the amount of ethylene in the surrounding environment as parts per million (ppm). The IR camera is wirelessly coupled to one of a local ethylene level calculator and/or a remote ethylene level calculator via wireless transmitter. In one embodiment the ethylene sensor and/or local ethylene level detector is communicatively connected to the wireless transmitter, and the reading from the ethylene sensor and/or the IR detector is communicated to the AC monitoring server 110. The AC monitoring system 105 (which includes server 110 executing a RACMC module/utility 112) compares the received ethylene reading to the acceptable range or max threshold value of ethylene level (e.g., 45 ppm). In response to the reading being above the max threshold value, the monitoring system generates a notification that is communicated to one of (i) the shipper, (ii) the operator (via the driver's mobile device or the PUD), and (ii) other pre-registered/established interested entity(s).

FIG. 8B illustrates an example of data and a notification that can be communicated to the MCD 800 of a driver/operator. In the example of FIG. 8B an example ambient condition setup and monitoring UI 870 of LACMC App 164 is presented for a particular cargo that includes a product, bananas, that is sensitive to exposure to ethylene gas over a specific ppm during shipment. The LACMC mobile app presents a user interface 870 that tracks and reports, in real time, the actual temperature and the ethylene level within the container. According to the illustrated embodiment, at least the ambient ethylene level reading and the temperature readings are communicated to the driver's MCD 800. It is appreciated that the communication of these readings may also be to remote server 110 and/or controller 144, in alternate embodiments. In the illustrated embodiment, in response to the warning status approaching yellow or red (FIG. 3B), a notification 872 is generated and displayed with a warning message of a problem state (or out of bounds/range condition) occurring within the container housing the product/good. Further, in one embodiment, the notification to the driver/operator includes a series of additional instructions 874 on what steps are required to correct the problem with the high ethylene reading and can include a time frame for making the corrections. The UI 870 also provides the operator/driver with selectable options to alert and/or inform other relevant parties to the shipment, including requesting a new shipping container to offload the cargo, if the problem can be isolated to a fault with the current shipping container.

As one component, the exposure time of the produce or goods to the increased temperature and/or ethylene levels is recorded within one or both databases, DB 114/817 and utilized in determining a "goodness rating" of the produce.

The goodness rating can be utilized to provide a post shipment shelf-life, or an adjusted shelf-life, which is a more accurate value as compared to an initial shelf life that is affixed to the produce. The initial shelf life would be one calculated based on an expectation of different conditions within the shipping container than the actual ambient conditions experienced during transportation of the produce/ good.

In yet another embodiment, operators are selected based on an understanding of the value of keeping the goods within certain parameters during shipment, and the rating of an operator is affected and/or adjusted, based in part on one or more of (i) the operators outfitting the containers with the sensors, (ii) the responsiveness of the operator to issues identified during shipping (time to fix identified issues after notification provided), and (iii) the ability of the shipper to trigger a remote control of ambient conditions within the container to be within pre-set ranges of conditions, where or when discrepancies or (AC "out of bounds" conditions) are identified during shipment. A driver/operator with a communication device equipped with the ACMN app to receive the notifications is also able to modify the ambient conditions to protect the products and can then provide, via the ACMN app, independent verification of the conditions within which the produce is transported.

According to a related aspect, the selection of a specific carrier/driver/equipment (i.e., by a shipper or by the automated TCIS carrier selection process) for carrier selection based on a carrier ranking/profile, for the transportation of the particular shipment can be directly tied to a historical tracking of the success rate of the carrier/driver/equipment with getting the transported produce to its destination without negatively affecting the shelf life of the produce due to overexposure to a ripening agent or other adverse ambient conditions in the container during the transportation of the shipment.

Historical tracking of shipping condition data can also be accomplished with the periodic or continuous reporting of the ambient conditions. This historical tracking can then be utilized to generate a graph, pictograph, pictogram, or other presentation of the data or summary thereof that can be used in evaluating correlations between different products being shipped from a particular source to one or more destinations by different carriers/drivers.

Other aspects of the illustrative embodiments provide for generation of real-time alerts/notification of differences (i.e., values falling outside a preset delta) in the temperature reading between the inbuilt temperature sensor and the second temperature sensor. Additional aspects provide for similar real-time alerts for detected ethylene levels first above a lower ethylene threshold and then above a higher ethylene threshold value, allowing for time to adjust the conditions before the produce becomes exposed to the higher levels of ethylene.

Another aspect of the disclosure is presented by FIG. 9, which provides a method for evaluating shelf life of AC-sensitive goods that are being transported within shipping containers whose ambient conditions can be monitored by a remote monitoring system during transportation. The AC-sensitive good is assumed to be a perishable product, such as a fruit or vegetable or a meat or fish, which deteriorates when exposed to ambient conditions with variables that fall outside of a desired or optimal range for those variables. It is appreciated that evaluating shelf life based on parameter values received from inside the actual container within which the good are being transported enables a more accurate determination by all relevant parties of timing of a products deterioration, relative to a time extending from a start time of the transportation to placement of the product on the shelf at a retail/wholesale establishment. The shelf life evaluation can also be utilized to implement pricing adjustments at the retail end to encourage purchase of retail goods ahead of the adjusted shelf life expiration date when that date occurs before the normal shelf life date due to exposure to non-ideal ambient conditions during transportation from the shipper to the retailer.

FIG. 9 begins at the start block and proceeds to block 902 at which method 900 includes detecting an occurrence of one or more conditions during shipping of the perishable product that can affect the shelf life of the product. Method 900 includes determining, using a shelf life adjustment algorithm, if a calculated updated shelf life deviates from a pre-established normal shelf life of the product by more than a threshold (block 904). In response to the shelf life deviating by more than the threshold, based on the occurrence of the one or more conditions negatively affecting the pre-scribed ambient conditions of the cargo during transportation (as determined at decision block 906), method 900 includes performing one or more actions to notify at least one of the monitoring service personnel, the shipper, a retailer selling the product, and an end consumer of the reduced shelf life of the product (block 908). Method 900 then ends.

In the above description, exemplary embodiments in which various aspects of the disclosure may be practiced are described in general detail to enable those skilled in the art to practice the invention. It is to be understood that other embodiments may be utilized and that logical, architectural, programmatic, mechanical, electrical and other changes may be made without departing from the spirit or scope of the present disclosure. The above description is an extended summary and therefore, should not to be taken in a limiting sense, and the scope of the present disclosure will be defined by appended claims and equivalents thereof. Other aspects of the disclosure that stem from and/or are extensions of the above described processes are presented generally within the aforementioned descriptions and/or the figures accompanying this submission. Nothing within the present descriptions are to be taken as limiting on the scope of the greater application of the disclosure within the shipping and transportation industry/space or more general perishable product space.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the invention not be limited to the particular embodiments disclosed for carrying out the disclosure, but that the disclosure will include all embodiments falling within the scope of any appended claims. Moreover, the use of the terms first, second, etc. do not denote any order or importance, but rather the terms first, second, etc. are used to distinguish one element from another.

What is claimed is:

1. A method for maintaining ideal ambient conditions for one or more goods being transported within a shipping container, the method comprising:

periodically receiving, from at least one sensor located within the shipping container, a current value of a first parameter corresponding to an ambient condition being monitored within the shipping container by the at least one sensor;

comparing the received first parameter value with a pre-established optimal value or range of values for the first parameter that represents an ideal ambient condition for the one or more goods being transported within the shipping container; and in response to the first parameter value being outside of the optimal range of values for the first parameter:

identifying whether a next one or more first parameter value received continues to be outside of the optimal range of values by:

initiating an increased frequency heightened monitoring and response (IFHMP) window during which a frequency of receiving and comparing corresponding first parameter values against the optimal range of values is increased; and receiving the next one or more first parameter value within the IFHMP window; and in response to the next parameter value received within the IFHMP window also being outside of the optimal range of values for the first parameter, triggering a correction response that notifies at least one interested party of the failure to maintain the ambient condition within the optimal range and causes a correction in the ambient condition.

2. The method of claim 1, further comprising:
issuing a notification of a failed ambient condition check;
remotely triggering a correction within the shipping container to bring the first parameter value back within the optimal range of values.

3. The method of claim 1, wherein triggering the correction response comprises:
generating and communicating a notification to at least one interested party from among a driver/operator of a tractor hauling the shipping container, a carrier, a shipper, monitoring system personnel, and a shipment recipient personnel, and a third party registered to receive notification of ambient condition failures.

4. The method of claim 3, further comprising:
remotely communicating the notification, via one or more communication networks, to a respective mobile communication device of the driver/operator and an in-vehicle shipment tracking device configured with an output mechanism; and
providing within the notification to a personnel in proximity to the shipping container, at least one operation required to counter or reverse the change in the ambient condition to bring the first parameter value back within the optimal range of values.

5. The method of claim 4, further comprising:
recording an occurrence of an ambient condition failure within a shipment tracking database;
monitoring for at least one correction confirmation from among (i) a change in the ambient condition resulting in a next set of parameter values being within the optimal range of values and (ii) confirmation from a personnel in proximity to the shipping container that the at least one operation has been successfully completed within a preset timeframe;
in response to not receiving at least one correction confirmation, enabling remote access, by one of a remote server and a remote technician, to a control mechanism within the shipping container to remotely trigger a change in the detected ambient condition where the first parameter value falls within the optimal range of values.

6. The method of claim 5, further comprising:
confirming, by comparing subsequently received first parameter values against the optimal range of values, whether an attempt to reverse the out of bounds condition has been successful within the preset timeframe;
in response to the subsequently received first parameter values being within the optimal range of values, indicative of a successful reversal, forwarding, via the communication network, information related to the occurrence of an AC failure condition to a computer device of at least one of the carrier and the shipper; and
in response to the not receiving confirmation of the success of the reversal:
escalating a status of the AC failure condition; and
communicating an escalated status notification to each interested party, including the driver/carrier, and at least one of the shipper and the monitoring service personnel.

7. The method of claim 1, further comprising:
initiating an increased frequency heightened monitoring and response (IFHMP) window during which a frequency of receiving and comparing corresponding first parameter values against the optimal range of values is increased, the initiating of the IFHMP window comprising activating a timer to track an elapsed time since receipt of the first parameter value that was outside of the optimal range of values, wherein the IFHMP window is a pre-set amount of time during which multiple sensor readings are received for the first parameter and compared to the range of values to confirm whether the first parameter value being outside the range was a false positive or was triggered based on a temporary condition that was resolved before expiration of the IFHMP window; and
receiving the next one or more first parameter value within the IFHMP window.

8. A system for maintaining a desired ambient condition for one or more cargo being transported, the system comprising:
a vehicle for transporting the one or more cargo from an origination point to a destination point, the vehicle having a driver/operator and comprising a shipping container within which the one or more cargo are being transported;
a plurality of sensors located within the shipping container and which sense and records one or more parameter values of variables associated with an ambient condition within the shipping container;
a remote monitoring system having a server that receives the one or more parameter values of the variables associated with the ambient condition within the shipping container, the server of the remote monitoring system being communicatively connected, via at least one communication network, to the plurality of sensors to enable transfer of information related to the one or more parameter values and the ambient condition between the plurality of sensors and the server;
wherein the server executes a remote ambient condition monitoring and out-of-range notification and correction (RACMC) module, which configures the server to:
periodically receive, from at least one of the one or more sensors, a current value of a first parameter corresponding to a sensed ambient condition being monitored within the shipping container;

compare the received first parameter value with a pre-established optimal value or range of values for the first parameter that represents an ideal ambient condition for the one or more goods being transported within the shipping container; and in response to the first parameter value being outside of the optimal range of values for the first parameter:
identifies whether a next one or more first parameter value received continues to be outside of the optimal range of values; and in response to the next parameter value being outside of the optimal range of values for the first parameter, trigger a correction response that notifies at least one interested party of the failure to maintain the ambient condition within the optimal range and causes a correction in the ambient condition.

9. The system of claim 8, wherein the RACMC module further configures the server to:
issue a notification of a failed ambient condition check;
remotely trigger a correction within the shipping container to bring the first parameter value back within the optimal range of values.

10. The system of claim 8, wherein, prior to triggering the correction response, the server:
initiates the IFHMP window during which a frequency of receiving and comparing corresponding first parameter values against the optimal range of values is increased, wherein initiating the IFHMP window comprises activating a timer to track an elapsed time since receipt of the first parameter value that was outside of the optimal range of values, wherein the IFHMP window is a pre-set amount of time during which multiple sensor readings are received for the first parameter and compared to the range of values to confirm whether the first parameter value being outside the range was a false positive or was triggered based on a temporary condition that was resolved before expiration of the IFHMP window;
identifies whether a next one or more first parameter value received within the IFHMP window continues to be outside of the optimal range of values; and
triggers the correction response in response to the next parameter value being outside of the optimal range of values for the first parameter.

11. The system of claim 8, wherein in triggering the correction response, the server:
generates and communicates a notification to at least one interested party from among the driver/operator of a tractor hauling the shipping container, a carrier, a shipper, monitoring system personnel, and a shipment recipient personnel, and a third party registered to receive notification of ambient condition failures;
remotely communicates the notification, via the one or more communication networks, to a respective mobile communication device of the driver/operator and an in-vehicle shipment tracking device configured with an output mechanism; and
provides within the notification to a personnel in proximity to the shipping container, at least one operation required to counter or reverse the change in the ambient condition to bring the first parameter value back within the optimal range of values.

12. The system of claim 11, wherein the RACMC module configures the server to:
record an occurrence of an ambient condition failure within a shipment tracking database communicatively connected to the server;

confirm, by comparing subsequently received first parameter values against the optimal range of values, whether a reversal of an out of range condition has been successful within the preset timeframe;

in response to the subsequently received first parameter values being within the optimal range of values, indicative of a successful reversal, forward, via the communication network, information related to the occurrence of an AC failure to a computer device of at least one of the carrier and the shipper; and in response to the not receiving confirmation of the success of the reversal:
escalating a status of the AC failure condition; and
communicating an escalated status notification to each interested party, including the driver/carrier, and at least one of the shipper and the monitoring service personnel.

13. The system of claim 8, further comprising:
at least one local control mechanism located within one of the shipping container and the vehicle and which operates as an ambient condition setting unit, the at least one control mechanism communicatively connected to the server via one of the at least one communication network;
wherein the RACMC module further configures the server to:
monitor for at least one correction confirmation from among (i) a change in the ambient condition resulting in a next set of parameter values being within the optimal range of values and (ii) confirmation from a personnel in proximity to the shipping container that the at least one operation has been successfully completed within a preset timeframe; and
in response to not receiving at least one correction confirmation, enable remote access, by one of a remote server and a remote technician, to the control mechanism within the shipping container to remotely trigger a change in the detected ambient condition where the first parameter value falls within the optical range of values.

14. The system of claim 8, further comprising:
a mobile communication device (MCD) of the driver/operator of the vehicle, the MCD communicatively coupled to the server via the at least one network and having a shipment ambient condition monitoring app installed thereon that generates and outputs a real-time status of the ambient condition of the shipping container and which presents an alert in response to the ambient condition falling outside of the preset norms for the particular cargo being transported;
wherein the app further configures the MCD to communicatively connect to and receive, in real time, values of at least one tracked parameter and other information from the at least one sensors within the shipping container;
wherein the app further configures the MCD to present to the user an interface that enables the user to enter shipment-related authorization codes and subsequently modify the parameter settings within the container to within a prescribed range of adjustment.

15. A cargo carrier comprising:
a shipping container having exterior walls that encloses an interior space for holding a cargo;
at least one component that sets and modifies an ambient condition within the shipping container;
a plurality of sensors, each sensing a current parameter value of at least one variable component of the ambient condition, the plurality of sensors comprising: a primary sensor for locally tracking a value associated with the ambient condition, the primary sensor being associated with and utilized by the carrier to independently determine a current ambient condition; and at least one secondary sensor provided by a shipment monitoring service and which senses a same ambient condition variable as the primary sensor;

a controller that is communicatively coupled, via a local connection, to each of the plurality of sensors and the at least one component and communicatively connected, via an external network, to a remote server, wherein the plurality of sensors are each configured to communicate to the controller, in real time, the current parameter value of the at least one variable and the controller operates as an aggregator of information received from the at least one sensor and the controller: compares a second reading of the at least one secondary sensor with a first reading of the primary sensor; determines when a difference between the second reading and the first reading is greater than a pre-established maximum difference threshold value; and transmits, via the external network, the received current parameter values to the server for remote tracking of the ambient condition within the shipping container, wherein the controller comprises a transceiver and is further configured to:

receive, via the transceiver, control instructions communicated from the server to modify one or more parameter values associated with the ambient condition; and in response to receiving the control instructions, trigger the at least one component to modify a corresponding variable component of the ambient condition.

16. The cargo carrier of claim 15, further comprising a vehicle attached to the shipping container, the vehicle controlled by a driver/operator having a mobile communication device that is communicatively connected to at least one of the controller and the remote server to provide notification alerts to the driver/operator when at least one parameter value of the corresponding variable component associated with the ambient condition falls outside of a pre-set acceptable range of values.

17. The cargo carrier of claim 15, wherein the at least one sensor comprises an ethylene sensor, and the controller includes an executable module that controls a level of ethylene within the interior space to below a pre-programmed number of parts per million by modifying, via an appropriate one of the at least one component, the corresponding variable component within the interior space.

18. A method of locally monitoring and adjusting ambient condition settings for a cargo that requires specific ambient conditions within a shipping container during transportation, the method comprising:

communicatively connecting, by a controller, to at least one sensor placed in proximity to a cargo being monitored by a shipment monitoring service, the at least one sensor sensing a real-time value in one or more specific ambient conditions within a shipping container in which the cargo is being transported, the at least one sensor including: a primary sensor for locally tracking a value associated with at least one of the one or more specific ambient conditions, the primary sensor being associated with and utilized by a carrier to independently determine a current ambient condition of the at least one of the one or more specific ambient conditions; and at least one secondary sensor provided by the shipment monitoring service which senses a same ambient condition variable as the primary sensor;

receiving, from the at least one sensor, sensor data indicating a real-time parameter value of at least one variable contributing to a current ambient condition of the shipping container;

transmitting, via a communication device associated with the controller, received sensor data to a remote monitoring server, the remote monitoring server executing a remote ambient condition monitoring and out-of-range notification and correction (RACMA) utility that enables the remote monitoring server to determine the current ambient condition and identify when the current ambient condition falls out of bounds for a predetermined optimal range for an ideal ambient condition required for the specific cargo being transported within the container; and communicatively connecting the controller with a local ambient condition controlling mechanism that supports both local and remote adjustments of one or more parameter settings that control the ideal ambient condition; and in response to receiving, from the remote monitoring server, a control setting that modifies the parameter value associated with a specific ambient condition that is configurable by the local ambient condition controlling mechanism, triggering the local ambient condition controlling mechanism to implement the control setting to enabling modification of the parameter value associated with the local ambient condition surrounding the cargo within the container.

19. The method of claim 18, further comprising:

comparing, via a processor of the controller, a second reading of the at least one secondary sensor with a first reading of the primary sensor;

determining when a difference between the second reading and the first reading is greater than a pre-established maximum difference threshold value; and in response to the difference between the first and second readings being greater than the pre-established maximum difference threshold value: generating a faulty reading notification message; and transmitting the faulty reading notification message to at least one of a driver's mobile communication device, the remote monitoring server, a communication/computer device of the carrier, and a communication/computer device of a shipper.

* * * * *